(12) United States Patent
Doddamani et al.

(10) Patent No.: US 11,189,085 B2
(45) Date of Patent: Nov. 30, 2021

(54) TECHNOLOGIES FOR GENERATING COMPUTER MODELS, DEVICES, SYSTEMS, AND METHODS UTILIZING THE SAME

(71) Applicant: INTEL CORPORATION, Santa Clara, CA (US)

(72) Inventors: Shivakumar Doddamani, Dallas, TX (US); Jim S. Baca, Corrales, NM (US)

(73) Assignee: INTEL CORPORATION, Santa Clara, CA (US)

( * ) Notice: Subject to any disclaimer, the term of this patent is extended or adjusted under 35 U.S.C. 154(b) by 518 days.

(21) Appl. No.: 15/580,235

(22) PCT Filed: May 27, 2016

(86) PCT No.: PCT/US2016/034731
§ 371 (c)(1),
(2) Date: Oct. 29, 2019

(87) PCT Pub. No.: WO2016/209551
PCT Pub. Date: Dec. 29, 2016

(65) Prior Publication Data
US 2020/0184717 A1 Jun. 11, 2020

Related U.S. Application Data

(63) Continuation of application No. 14/751,859, filed on Jun. 26, 2015, now abandoned.

(51) Int. Cl.
*G06T 17/00* (2006.01)
*G06T 17/05* (2011.01)
(Continued)

(52) U.S. Cl.
CPC ............ *G06T 17/00* (2013.01); *A63F 13/211* (2014.09); *A63F 13/213* (2014.09);
(Continued)

(58) Field of Classification Search
CPC ...................................................... G06T 11/60
See application file for complete search history.

(56) References Cited

U.S. PATENT DOCUMENTS

| 7,127,378 B2 | 10/2006 | Hoffman et al. |
| 8,633,970 B1 | 1/2014 | Mercay et al. |

(Continued)

FOREIGN PATENT DOCUMENTS

| CN | 101509763 | 8/2009 |
| CN | 101742349 | 6/2010 |

(Continued)

OTHER PUBLICATIONS

International Search Report and Written Opinion issued in PCT Application No. PCT/US2016/034731, dated Aug. 18, 2016, 13 pages.

(Continued)

*Primary Examiner* — Phi Hoang
(74) *Attorney, Agent, or Firm* — Hanley, Flight & Zimmerman, LLC

(57) ABSTRACT

Technologies for generating 3D and using models are described. In some embodiments the technologies employ a content creation device to produce a 3D model of an environment based at least in part on depth data and color data, which may be provided by one or more cameras. Contextual information such as location information, orientation information, etc., may also be collected or otherwise determined, and associated with points of the 3D model. Access points to the imaged environments may be identified and labeled as anchor points within the 3D model. Multiple 3D models may then be combined into an aggregate model, wherein anchor points of constituent 3D models in the (Continued)

aggregate model are substantially aligned. Devices, systems, and computer readable media utilizing such technologies are also described.

21 Claims, 7 Drawing Sheets

(51) Int. Cl.

| | |
|---|---|
| *A63F 13/52* | (2014.01) |
| *A63F 13/213* | (2014.01) |
| *A63F 13/211* | (2014.01) |
| *A63F 13/216* | (2014.01) |
| *A63F 13/825* | (2014.01) |
| *H04N 13/271* | (2018.01) |
| *G06F 16/29* | (2019.01) |
| *G06T 7/536* | (2017.01) |

(52) U.S. Cl.
CPC ............ *A63F 13/216* (2014.09); *A63F 13/52* (2014.09); *A63F 13/825* (2014.09); *G06F 16/29* (2019.01); *G06T 7/536* (2017.01); *G06T 17/05* (2013.01); *H04N 13/271* (2018.05); *G06T 2207/10024* (2013.01); *G06T 2207/10028* (2013.01)

(56) References Cited

U.S. PATENT DOCUMENTS

| | | | |
|---|---|---|---|
| 2010/0290709 A1* | 11/2010 | Lan .................... | G06K 9/3241 382/209 |
| 2012/0173204 A1* | 7/2012 | Padmanabhan ......... | G01S 15/89 703/1 |
| 2012/0194517 A1* | 8/2012 | Izadi ...................... | G06T 7/20 345/420 |
| 2012/0194644 A1* | 8/2012 | Newcombe ............... | G06T 7/20 348/46 |
| 2014/0088928 A1* | 3/2014 | Chen ..................... | G06F 30/13 703/1 |
| 2014/0184749 A1 | 7/2014 | Hilliges et al. | |
| 2015/0054823 A1 | 2/2015 | Dzhurinskiy et al. | |
| 2015/0077517 A1 | 3/2015 | Powers et al. | |
| 2015/0187108 A1* | 7/2015 | Mullins .................. | G06T 11/60 345/633 |
| 2015/0206361 A1* | 7/2015 | Chen ...................... | G06F 30/13 340/5.2 |
| 2015/0231503 A1* | 8/2015 | Kruglick ............... | G06T 19/006 463/31 |
| 2016/0055268 A1* | 2/2016 | Bell .................... | G06K 9/00201 703/1 |
| 2016/0154290 A1 | 6/2016 | Brown et al. | |
| 2016/0225187 A1* | 8/2016 | Knipp .................. | G06T 19/006 |

FOREIGN PATENT DOCUMENTS

| | | |
|---|---|---|
| CN | 102609942 | 7/2012 |
| CN | 102622762 | 8/2012 |
| CN | 102681661 | 9/2012 |
| CN | 103260015 | 8/2013 |
| CN | 103582902 | 2/2014 |
| WO | 2011060385 | 5/2011 |
| WO | 2015041697 A1 | 3/2015 |

OTHER PUBLICATIONS

Constine, Josh: "Atlas Virtual Reality Turns Any Room Into A Holodeck You Can Run Around In," Tech Crunch, Jul. 29, 2013, 14 pages, http://techcrunch.com/2013/07/29/atlas-virtual-reality-turns-into-a-holodeck-you-can-run-around-in/.
Omni: Real Battlefield Place, Virtuix Omini (Virtuix.com), Jun. 8, 2013, https://www.youtube.com/watch?v=J3vHv4INvg4, 4 pages.
RoomAlive: Magical Experiences Enabled by Scalable, Adaptive Projector-Camera Units, Microsoft-liveroom, Oct. 5, 2014, https://www.youtube.com/watch?v=ILb5ExBzHqw, 4 pages.
Office Action issued in U.S. Appl. No. 14/751,859, dated Feb. 10, 2017, 14 pages.
Final Office Action issued in U.S. Appl. No. 14/751,859, dated Jun. 12, 2017, 14 pages.
International Preliminary Report on Patentability and Written Opinion issued in PCT Application No. PCT/US2016/034731, dated Jan. 4, 2018, 10 pages.
European Patent Office, "Extended European Search Report," issued in connection with European Patent Application No. 16814995.3, dated Dec. 14, 2018, 14 pages.
Chinese Patent Office, "Office Action," issued in connection with Chinese Patent Application No. 201680030340.6, dated Jun. 22, 2020, 9 pages (no translation available).
Supplementary European Search Report in related European Application No. 16814995.3, dated Dec. 14, 2018, 14 pages.
Mirowski et al: "SignalSLAM: Simultaneous Localization and Mapping with Mixed WiFi, Bluetooth, LTE and Magnetic Signals", 2013 International Conference on Indoor Positioning and Indoor Navigatin, IEEE, Oct. 28, 2013, XP032595648, 10 pages.
Karadeniz: "Map Merging for Multi Robot Slam", Dec. 16, 2014, XP055527266, retrieved from the Internet URL:http://etd.lib.metu.edu.tr/upload/12618311/index.pdf, retrieved on Nov. 27, 2018, 190 pages.
Shi et al.: "GPS-Supported Visual SLAM with a Rigorous Sensor Model for a Panoramic Camera in Outdoor Environments", vol. 13, No. 1, Dec. 21, 2012, XP05527312, 18 pages.
Jensfelt et al., "Augmenting SLAM with Object Dection in a Service Robot Framework," 15th IEEE International Symposium on Robot and Human Interactive Communication (RO-MAN06), Sep. 6-8, 2006, 6 pages.
Want et al., "Dection and Tracking of Moving Objects in SLAM using Vision Sensors," 2011 IEEE International nstrumentation and Measurement Technology Conference (I2MTC 2011), May 10-12, 2011, 9 pages.
Choudhary et al., "SLAM with Object Discovery, Modeling and Mapping," 2014 IEEE/RSJ International Conference on Intelligent Robots and Systems (IROS 2014) Sep. 14-18, 2014, 8 pages.
European Patent Office, "Communication pursuant to Article 94(3) EPC," issued in connection with European Patent Application No. 16 814 995.3, dated Dec. 18, 2020, 9 pages.
State Intellectual Property Office of People's Republic of China, "The Second Office Action," issued in connection with Chinese Patent Application No. 201680030340.6, dated Mar. 24, 2021, 13 pages. (Machine translation provided).
State Intellectual Property Office of People's Republic of China, "The Third Office Action," issued in connection with Chinese Patent Application No. 201680030340.6, dated Jul. 14, 2021, 14 pages. (Partial Machine translation provided).

* cited by examiner

TECHNOLOGIES FOR GENERATING COMPUTER MODELS, DEVICES, SYSTEMS, AND METHODS UTILIZING THE SAME

CROSS-REFERENCE TO RELATED APPLICATIONS

This present application is a National Phase Application Filed Under 35 U.S.C. 371 claiming priority to PCT/US2016/034731 filed May 27, 2016, which in turn claimed priority from U.S. Non-Provisional patent application Ser. No. 14/751,859, filed Jun. 26, 2015, the entire disclosures of which are incorporated herein by reference.

FIELD

The present disclosure relates to technologies for generating computer models. More particularly, the present disclosure relates to devices, systems, methods, and/or computer readable media for generating computer models of real world environments, and using such models for various applications.

BACKGROUND

Over the past few decades video games have become increasingly popular. As a result the video game industry has grown tremendously, and now produces annual revenues in the United States that approach or even exceed ten billion dollars per year. The popularity of video games has similarly increased in other countries, and particularly in Japan, Korea, and the European Union.

With the foregoing in mind, consumers are increasingly demanding games that provide entertaining gameplay in the context of an interesting and highly detailed graphical setting. Three dimensional (3D) computer models of objects and environments used in video games have therefore grown increasingly complex. In many instances such models are produced by computer graphics artists using complex 3D modeling applications. However in some instances, specialized 3D scanners may be used to convert scale models or life size objects to 3D computer models. In either case, specialized hardware, software, and/or highly trained artists may be required. Generation of 3D models of assets to be used in a complex video game and/or a virtual reality environment may therefore be time consuming and expensive.

In some instances consumers may derive significant enjoyment from the fact that a video game or virtual reality environment is set in or otherwise simulates a real world location. This is particularly true in the context of sports games (e.g., football, baseball, soccer, auto sports, etc.). For such games, game developers often attempt to replicate or otherwise simulate well known sporting locations such as a baseball stadium, football stadium, race track, and the like. Computer graphics artists may therefore exert painstaking effort to manually create 3D models of such locations based on photographs, measurements, architectural plans, and the like. Although reasonably accurate models of such locations may be created in this manner, the production of such models may be quite expensive and time consuming, and may still result in a 3D model that is not a precise replica of the real world location. As a result, the generation of such models may be reserved for relatively famous locations that may play an important role in a video game or virtual reality experience. Put in other terms, due to the cost and effort associated with the manual production of models of real world locations and/or objects, it may not be cost effective or otherwise desirable to produce 3D models of less compelling real world locations or real world objects, such as a player's real world home, a local park, generic real world housewares, and the like.

In addition to the above, video games are now routinely developed such that the objects and/or environments therein are designed to react in a realistic manner, e.g., in response to player interactions, simulated weather conditions, and the like. For example virtual objects may be associated with object properties (e.g., physical attributes such as mass, transparency, strength, etc.), such that such objects behave in a realistic or other desired manner within the game environment. However, the association of object properties to 3D models of objects and/or environments often entails time consuming and cumbersome manual assignment of such parameters to a plurality of individual 3D models of such objects, e.g., by a computer graphics artist. Although databases associating pre-developed 3D models with object properties are available, reliance on such database(s) may undesirably limit the creative freedom of the computer graphics artist to objects that are already present in the database.

BRIEF DESCRIPTION OF THE DRAWINGS

Features and advantages of embodiments of the claimed subject matter will become apparent as the following Detailed Description proceeds, and upon reference to the drawings, wherein like numerals depict like parts, and in which:

Figure 1:
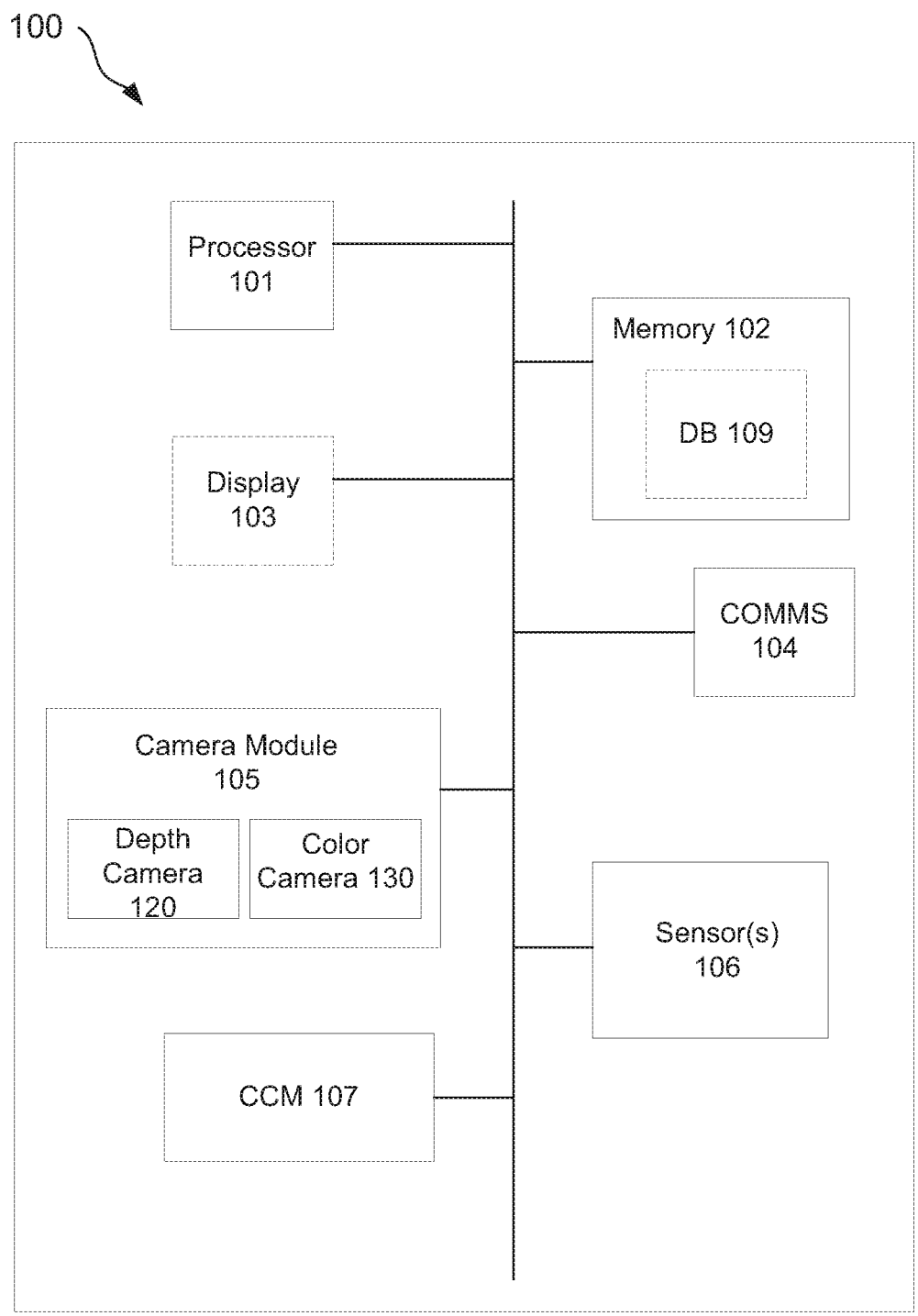
FIG. 1 depicts one example of a content creation device consistent with the present disclosure.

Although the following detailed description will proceed with reference being made to illustrative embodiments, many alternatives, modifications, and variations thereof will be apparent to those skilled in the art.

DETAILED DESCRIPTION

While the present disclosure is described herein with reference to illustrative embodiments for particular applications, it should be understood that such embodiments are for the sake of example only and that the invention as defined by the appended claims is not limited thereto. Those skilled in the relevant art(s) with access to the teachings provided herein will recognize additional modifications, applications, and embodiments within the scope of this disclosure, and additional fields in which embodiments of the present disclosure would be of utility.

As explained in the background, computer graphics artists are often charged with the generation of 3D models of objects and/or environments that are to be used as assets in a video game, a virtual reality environment, or the like. Although it is now possible to produce highly complex and detailed 3D models of such objects and environments, doing so may be both time consuming and expensive. This may be in part due to the fact that in many cases, computer graphics artists produce 3D models using 3D modeling software. Despite exertion of painstaking effort by such artists, 3D models produced in that manner may still not be a highly accurate representation of a real world object or environment. Indeed such models may represent an object or environment with slightly different dimensions, structure, texture, etc. than their real world counterparts.

In recent years interest has grown in the use of 3D imaging to produce 3D models for video games, virtual reality applications, and the like. In that regard some effort has focused on the use of 3D imaging systems to produce 3D models of real world objects and environments. Such systems may be used to "image" an environment or object so as to obtain data which may be used to generate a 3D computer model (also referred to herein as a "computer model" or a "3D model). For example, a 3D imaging system may use one or more depth cameras (also known has z-cameras and/or 3D cameras) to obtain depth data from an environment/object, and utilize such depth data to produce a 3D model of the environment/object using techniques understood in the art. Such systems may also utilize one or more visual (e.g., color) cameras to obtain color data from the imaged environment/object, which may be used to "texture" or "paint" the 3D model produced from the depth data. The resulting output may be a 3D model that reasonably simulates the structure and appearance of the imaged real-world environment/object. Indeed depending on the capabilities of the 3D imaging system, highly accurate 3D models of real world objects and isolated environments (e.g., single rooms) may be created in this manner.

Although prior efforts to use 3D imaging to produce 3D models are interesting, they may suffer from various drawbacks. For example to the inventors' knowledge existing 3D imaging systems are often limited to the production of 3D models of an isolated environment or object, such as a single room or a single object. Put in other terms, to the inventor' knowledge existing 3D imaging systems may be unable to image multiple rooms and/or objects at the same time. Rather, to image multiple environments (e.g., multiple rooms), it may be necessary to relocate a 3D imaging system from one environment (room) to the next, which may be inconvenient and may introduce other issues as described below.

For example existing 3D imaging systems may be used to image multiple environments (e.g., rooms) in the same location, e.g., by moving the 3D imaging system such that it can image each environment in isolation of the other environments at the location in question. As a result, multiple discrete 3D models may be produced, with each 3D model corresponding to one of the imaged environments. However, to the inventors' knowledge such systems do not understand the physical relationship between the imaged environments and, hence, the plurality of 3D models that are produced therefrom. That is, an existing 3D imaging system may be unaware of the relative position of a first imaged environment with respect to the position of another (e.g. second) imaged environment in the real world, and therefore may also be unaware of the positional relationship between 3D models of such environments. Moreover to the inventors' knowledge, existing 3D imaging systems do not monitor or otherwise understand the movement of 3D imaging system as it is used to image one or more environments.

Therefore while an existing 3D imaging system may be used to image multiple environments (e.g., rooms) to facilitate production of a corresponding number of discrete 3D models, it may be unaware of how the imaged environments are arranged relative to one another in the real world. Therefore when such a system combines the discrete models to form an aggregate model of the imaged environments, it may arrange the discrete 3d models such that they are in a straight line, even when the imaged environments may be arranged differently in the real world.

Figure 6A:
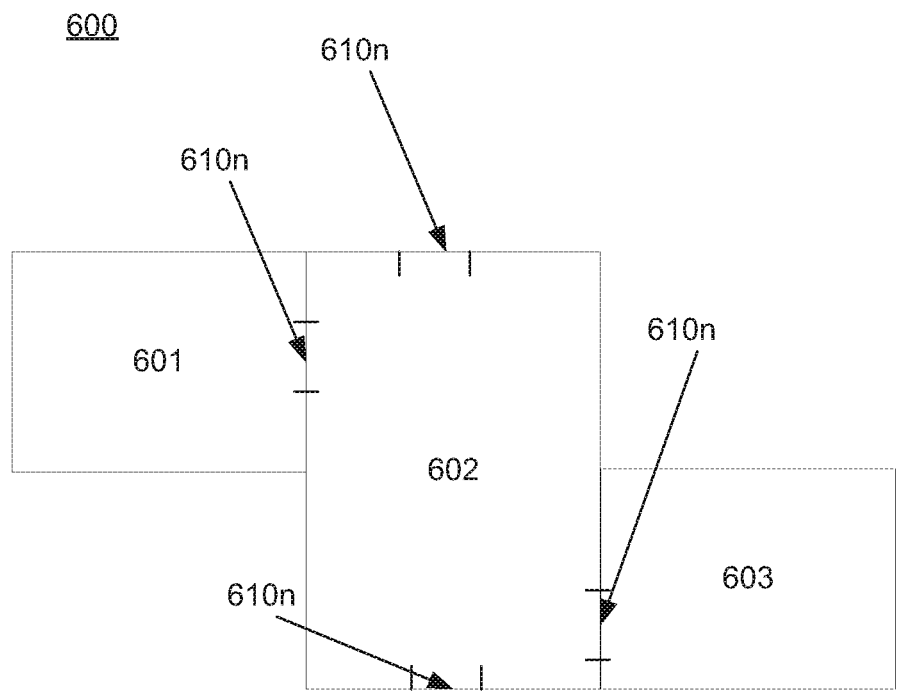
FIG. 6A depicts one example of a real world arrangement of three environments.
Figure 6B:
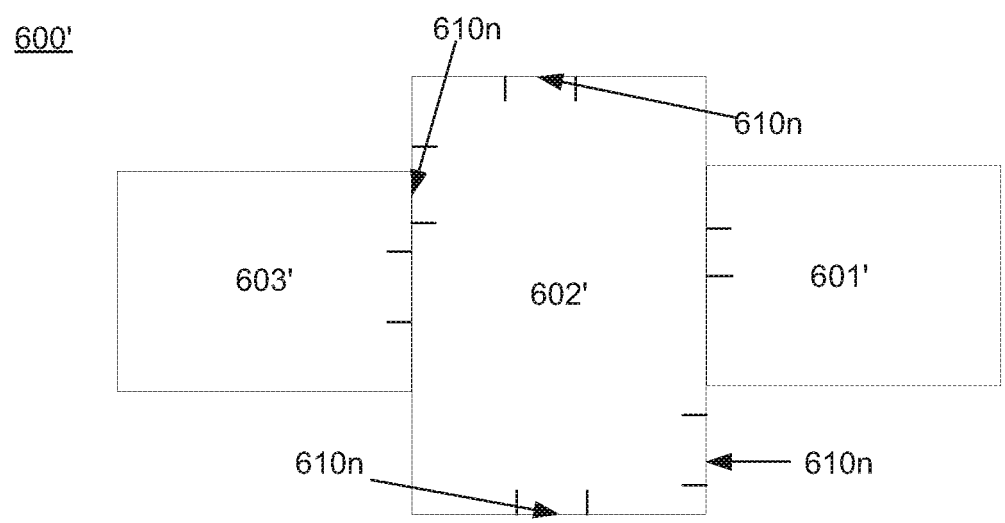
FIG. 6B illustrate one example of an aggregate model of the three environments of FIG. 6A arranged in a straight line.

This issue is illustrated in FIGS. 6A and 6B. FIG. 6A depicts one hypothetical example of a real world arrangement 600 of three environments, namely environments 601, 602, 603. For the sake of clarity, it may be helpful to understand environments 601, 602, 603 as rooms, but of course any suitable type of environment may be used. In arrangement 600, environment 602 is disposed between environments 601 and 603, and includes access points 610$n$, where n is an integer and in this case is equal to 4. Although not separately labeled, environments 601 and 603 include their own respective access points, which are joined and/or shared with access points 610$n$. For the sake of understanding, it may be useful to understand the access points of environments 601, 602, and 603 as doors, but of course any suitable access point (e.g., a window, hallway, etc.) may be used.

With the foregoing in mind, an existing 3D imaging system may be used to individually "scan" or "image" each of environments 601, 602, and 603. For example, a 3D imaging system including a color (e.g. visible) camera and a depth camera, and may be placed in the center of each of environments 601, 602, 603, e.g., on a pedestal. In operation, the 3D imaging system may use a depth camera to obtain depth information from the objects, walls, etc. within each environment, e.g., as the imaging system is rotated. Similarly, the 3D imaging system may use a visual camera to obtain color data (e.g., color data) from each environment.

Once depth and/or color data is obtained for an environment, the 3D imaging system may produce a distinct (i.e., separate) 3D model of each of environments 601, 602, 603, e.g., in the manner described previously. The 3D imaging system may then be tasked with combining the distinct models of environments 601, 602, 603, in an effort to produce an aggregate model that reflects arrangement 600. However because the 3D imaging system used does not understand the real world physical relationship (and in particular the positional relationship) between environments 601, 602, and 603, it may combine the 3D models of such environments in a manner that does not accurately reflect their real world arrangement (in this case, arrangement 600). For example and as shown in 6B, the 3D imaging system is likely to produce an aggregate model with an arrangement 600', i.e., where the models 601', 602', and 603' are arranged in a straight line.

Moreover the 3D imaging system is likely to produce an aggregate model that does not take into account the relative position of the access points of environments 601, 602, and 603. As a result, when the 3D imaging system combines models 601', 602', and 603', it may do so without regard to the alignment and/or relationship of the access points in such models. This concept is shown in FIG. 6B, wherein arrangement 600' includes models 603', 602', and 601' that are arranged in a straight line, and one or more access points of model 602' are not substantially aligned with one or more access points (not separately labeled) of model 601' or model 603', respectively.

It may therefore be appreciated that with an existing 3D imaging system proper arrangement of models 601', 602', 603' (e.g., in an aggregate model of the imaged environments) and their respective access points may require manual intervention, e.g., by a computer graphics artists, which may be undesirable for at least the reasons noted above. This issue may be exacerbated by the fact that, to the inventors knowledge, existing 3D imaging systems do not recognize access points in the imaged environment (in the foregoing example, one or more doors), and do not associate recognized access points with one or more points of a corresponding 3D model of the environment(s) in question.

Alternatively or in addition to the foregoing issues, to the inventors' knowledge existing 3D imaging systems also facilitate the production of a 3D model that renders or otherwise depicts an imaged environment in the form of a single virtual object. Consider a use case in which an existing 3D imaging system is used to image an environment (e.g., a room) that contains a door, four walls, a ceiling, a table and chairs and a bowl on the table. Using the system, depth and color data of the environment may be obtained and used to produce a 3D model wherein the walls, ceiling, table, chairs, and bowl are modeled as a single 3D object. That is, such systems may produce a 3D model wherein a model of the door is represented as integral with a model of the wall, a model of the table and chairs is represented as integral with the model of the floor, etc. For example, the existing 3D imaging system may produce a 3D mesh model of the environment wherein the mesh for the door is not distinct from the mesh of an adjacent wall, the mesh for the table is not distinct from the mesh of the floor, etc. In contrast, in the real world such objects may be distinct and may be separated from one another.

Put in other terms, just as some existing 3D imaging systems may not understand the physical relationship between multiple environments, they may also not understand the physical relationship between objects within those environments, between objects and boundaries (e.g., walls) of those environments, etc. Therefore while existing 3D imaging systems may be able to produce an accurate representation of various objects in an environment, they may render such objects in a 3D model as though they were all integral with one another, instead of as distinct objects. It may therefore be practically difficult to associate the various objects in a 3D model of an environment produced by some 3D imaging systems with distinct properties, e.g., as may be done in the development of video games and/or virtual reality environments.

With the foregoing in mind, one aspect of the present disclosure relates to a content creation device/system. In this regard reference is made to FIG. 1, which depicts one example of a content creation device consistent with the present disclosure. In general, content creation device 100 may be in the form of a mobile or other electronic device. Any suitable mobile or other electronic device may be used. Non-limiting examples of such devices include but are not limited to cameras, cell phones, computer terminals, desktop computers, electronic readers, facsimile machines, kiosks, netbook computers, notebook computers, internet devices, payment terminals, personal digital assistants, media players and/or recorders, one or more servers, set-top boxes, smart phones, tablet personal computers, ultra-mobile personal computers, wearable electronic devices (e.g., wrist worn electronic devices such as a smart watch, belt worn smart devices such as smart belt buckles, shirt worn smart devices such as smart pins, electronic headwear such as smart eyewear, combinations thereof, and the like), wired telephones, combinations thereof, and the like. Such devices may be portable or stationary. Without limitation, in some embodiments the devices described herein are in the form of a mobile electronic device such as a smart phone, a camera (e.g., a mobile 3D imaging system) a cell phone, a tablet personal computer, an ultra-mobile personal computer, a wearable electronic device, or the like. Without limitation, content creation device in some embodiments is in the form of a smart phone, a tablet personal computer, or a mobile 3D imaging system.

Regardless of its form factor and as shown in FIG. 1, content creation device 100 may include processor 101, memory 102, optional display 103, communications circuitry (COMMS) 104, camera module 105, one or more sensors 106, content creation module 107, and optional database (DB) 109. All of such components may be communicatively coupled to one another via a suitable interface, such as a bus. It is noted that for the sake of clarify FIG. 1 depicts content creation device 100 with limited components, and with various components that may be typically found in various electronic devices (e.g., antennas, multiplexers, batteries, etc., as may be found in modern mobile communications devices) omitted. One of ordinary skill will understand that the omitted components may be included in the architecture of content creation device 100 on an as needed or as desired basis. It should also be understood that any or all of the components of FIG. 1 may form all or a part of a device platform corresponding to the type of electronic device used as content creation device 100. Thus for example where content creation device is a smart phone, all or a portion of the components of FIG. 1 may be present on or as a part of a smart phone platform. In contrast where content creation device is a tablet personal computer, all or a portion of the components of FIG. 1 may be present on or as part of a tablet personal computer platform.

It is noted that for the sake of clarity and ease of understanding, the various components of content creation device 100 are illustrated in FIG. 1 and are described herein as though they are part of a single electronic device, such as a single mobile device. It should be understood that such description and illustration are for the sake of example only, and that the various components of content creation device 100 need not be incorporated into a single device. For example, the present disclosure envisions embodiments in which camera module 105, sensor(s) 106, CCM 107, or a combination thereof may be separate from content creation device 100. For example, all or a portion of camera module 105 (e.g., depth camera 120, color camera 130, etc.) may form all or a part of a separate device that may be coupled in a wired or wireless manner with content creation device 100. In such instances the aggregate of such discrete components may be referred to herein as a content creation system.

Processor 101 may be any suitable processor, such as a general purpose processor or application specific integrated circuit that may be capable of executing one or multiple threads on one or multiple processor cores. Without limitation in some embodiments processor 101 is a general purpose processor, such as but not limited to the general purpose processors commercially available from INTEL® Corp., ADVANCED MICRO DEVICES®, ARM®, NVIDIA®, APPLE®, and SAMSUNG®. In other embodiments, processor 101 may be in the form of a very long instruction word (VLIW) and/or a single instruction multiple data (SIMD) processor (e.g., one or more image video processors, etc.). It should be understood that while FIG. 1 illustrates content creation device 100 as including a single processor 101, multiple processors may be used.

Memory 102 may be any suitable type of computer readable memory. Example memory types that may be used as memory 102 include but are not limited to: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, memory 102 may include other and/or later-developed types of computer-readable memory. Without limitation, in some embodiments memory 102 is configured to store data such as computer readable instructions in a non-volatile manner.

When used, optional display 103 may be any suitable device for displaying data, content, information, a user interface, etc., e.g. for consumption and/or use by a user of content creation device 100. Thus for example, optional display 103 may be in the form of a liquid crystal display, a light emitting diode (LED) display, an organic light emitting diode (OLED) display, a touch screen, combinations thereof, and the like. In some embodiments, optional display 103 may be in the form of or include a wearable display. For example, optional display 103 may be in the form of a display that may be worn on the head of a user, e.g., as a helmet, eyewear, combinations thereof, or the like.

COMMS 104 may include hardware (i.e., circuitry), software, or a combination of hardware and software that is configured to allow content creation device 100 to receive and/or transmit data or other communications. For example, COMMS 104 may be configured to enable content creation device 100 to receive one or more contextual information signals from sensors 106, e.g., over a wired or wireless communications link (not shown). Similarly, COMMS 104 may be configured to enable content creation device to receive depth data, disparity data, and/or color data from camera module 105 or, more specifically, from depth camera 120 or color camera 130. Alternatively or additionally, COMMS 104 may enable content creation device 100 to send and receive data and other signals to and from another electronic device, such as another mobile or stationary computer system (e.g., a third party computer and/or server, a third party smart phone, a third party laptop computer, etc., combinations thereof, and the like). COMMS 104 may therefore include hardware to support wired and/or wireless communication, e.g., one or more transponders, antennas, BLUETOOTH™ chips, personal area network chips, near field communication chips, wired and/or wireless network interface circuitry, combinations thereof, and the like.

Camera module 105 may include hardware (e.g., circuitry), software, or a combination of hardware and software that is configured to allow content creation device 100 to image an environment/object so as to obtain at least one of depth data and color data from the imaged environment/object. In this regard and as further shown in FIG. 1., camera module may include depth camera 120 and color camera 130.

In general, depth camera 120 may include hardware (e.g., circuitry), software, or a combination of hardware and software that is configured to obtain depth and/or color data from an imaged environment/object. In this regard, depth camera 120 may include a light source that is configured to illuminate an object/environment with output light of a desired wavelength or range of wavelengths. In some embodiments, depth camera 120 includes a light source that is configured to output light that may be detected by depth camera 120, but may be invisible to color camera 130 and/or the human eye. Thus for example, the light source of depth camera 120 may emit light in a non-visible region of the electromagnetic spectrum, such as the infrared or ultraviolet regions of the electromagnetic spectrum. Without limitation, the light source of depth camera 120 in some embodiments is configured to produce output light in the infrared region of the electromagnetic spectrum, i.e., light having a wavelength between about 700 nanometers (nm) to about 1 millimeter, such as about 700 to about 1400 nm.

In operation, the light source of depth camera 120 may illuminate an environment/object with output light. The output light may be emitted in any suitable form, such as in the form of a single spot, a pattern of spots, a diffuse light distribution, etc. In this regard, the light source of depth camera 120 in some embodiments is configured to produce output light in a pattern which may facilitate the detection of depth data from an illuminated environment/object. In any case depth camera 120 may include one or more sensors that may detect the output light e.g., as it impinges on and/or is reflected from an imaged environment/object. In some embodiments the sensor may be a light sensor, such as but not limited to a complementary metal-oxide semiconductor (CMOS) sensor. Without limitation in some embodiments the output light is infrared light, and the sensor is a CMOS infrared light sensor. Of course, such sensors are identified for the sake of example, and any suitable sensor may be used.

In any case, the sensor(s) used in depth camera 120 may be configured to detect the output light from depth camera 120, so as to enable depth camera 120 to obtain depth data corresponding to an imaged environment/object, e.g., in one or more frames. Depth camera 120 may also be configured to transmit one or more data signals including depth data obtained in this manner, e.g., to content creation module (CCM) 107. For ease of reference, such signals are referred to herein as depth data signals.

As further shown in FIG. 1, camera module 105 may further include color camera 130. Color camera 130 may include or be in the form of hardware (e.g., circuitry), software, or a combination of hardware and software that is configured to obtain color data from an imaged environment/object. Without limitation, color camera 130 preferably is or includes a visual camera, i.e., a camera that is designed to record light in the visible region of the electromagnetic spectrum. More specifically, color camera 130 may in some embodiments be or include a visual camera that records color data of an imaged environment/object in one or more frames.

In operation, depth camera 120 may be used to image an environment/object and obtain depth data in a series of first frames, as described above, and to transmit such data in one or more signals (e.g., a depth signal) to content creation module 107. In addition, color camera 130 may be used to image the same environment/object, so as to capture color data from the environment/object in a series of second frames, and to transmit such color data (e.g., in a color data signal) to content creation module (CCM) 107. Without limitation, in some embodiments CCM 107 may be configured to control the operation of depth camera 120 and color camera 130, e.g., so as to temporally align production of the first frames and second frames. That is, CCM 107 may control the operation of depth camera 120 and color camera 130 such that first frames of depth camera 120 are produced at substantially the same time as second frames are produced by color camera 130. Moreover, in some embodiments CCM 107 may register first frames produced by depth camera 120 with corresponding second frames produced by color camera 130.

As noted above, camera module 105 (or, more specifically, depth camera 120 and color camera 130) may transmit data signals containing depth data and/or color data to CCM 107. While the present disclosure envisions embodiments wherein separate data signals are used to transmit depth data and color data (e.g., depth signals and color signals, respectively), the use of multiple signals is not required. Indeed the present disclosure envisions embodiments wherein camera module 105 operates to transmit a combination of depth and color data in one data signal. In such instances and for the sake of clarity, such a signal may be referred to herein as a camera data signal.

With the foregoing in mind, content creation module (CCM) 107 may include or otherwise be in the form of hardware (e.g., circuitry), software, or a combination of hardware and software that is configured to receive depth data of an imaged environment/object (e.g., from depth camera 120), and to create a depth map (or any other suitable description of depth) of the imaged environment/object from that depth data. CCM 107 may also include or otherwise be in the form of hardware (e.g. circuitry), software, or a combination of hardware and software that is configured to receive color data of an imaged environment/object (e.g., from color camera 130), and to register the color data to the depth data, to the depth map, or a combination thereof. Alternatively or additionally, CCM 107 may include or be in the form of a computer readable storage medium (in which case, e.g., CCM 107 may be maintained in memory 102) including instructions which when executed by a processor (e.g., processor 101) of content creation device 100, may cause content creation device 100 to perform operations consistent with the present disclosure, such as 3D model generation operations, aggregate model generation operations, game environment generation operations, combinations thereof, and the like.

For example, in some embodiments CCM 107 may calculate registration parameters that map the color data provided by color camera 130 to a depth map (or other representation of depth) produced at least in part from the depth data reported by depth camera 120. In some instances such registration may involve aligning points/color data of an image recorded by color camera 130 with corresponding points of depth map. CCM 107 may then operate to create a linked list of a 2D visual (e.g. color) data and depth values for each point in the depth map. Thereafter, CCM 107 may convert the linked list to a 3D model of the imaged object/environment, and store the 3D model on content creation device 101, e.g., in memory 102. In some embodiments the 3D model is a 3D mesh model, but of course other types of 3D models may be used.

Sensor(s) 106 are generally configured to provide contextual information to CCM 107, e.g., in one or more contextual information signals. In general and as will be described in detail below, the contextual information may be used by CCM 107 to detect or otherwise determine the orientation and/or position of content creation device (e.g., as first and second frames are produced by camera module 105) and, hence, of an imaged environment and/or objects therein. In some embodiments and as will be described later, the contextual information may also enable CCM 107 to identify physical relationships between multiple imaged environments, multiple objects within an imaged environment, or a combination thereof.

Non-limiting examples of contextual information include location information, motion information, and orientation information. In some embodiments the location information may correlate to the location of content creation device 100 and/or one or more imaged objects or environments. One non-limiting example of such location information is global positioning system (GPS) coordinates specifying a location of device 100 (or, more specifically, depth camera 120 and/or color camera 130), e.g., when camera module 105 is used to image an environment/object and record first frames (containing depth data) and second frames (containing color data), respectively. In any case when contextual information includes GPS coordinates, sensor(s) 106 may include a GPS sensor. Of course, the use of GPS coordinates as contextual information is for the sake of example only, and any suitable location information may be used. For example, in some embodiments the location information may correspond to the position of content creation device 100, e.g., relative to an item having a known location, such as a Wi-Fi access point. In such instances, sensor(s) 106 may include a Wi-Fi sensor that is configured to determine the location of content creation device 100 from Wi-Fi signals.

Motion information may reflect the motion of content creation device 100, either independently or relative to an imaged environment and/or object. One non-limiting example of suitable motion information is accelerometer data that reflects the motion of content creation device 100, e.g., as camera module produces first and/or second frames. In such instances, it may be understood that sensor(s) 106 may include a motion sensor, such as but not limited to an accelerometer. Of course the use of an accelerometer is for the sake of illustration only, and any suitable motion sensor (and corresponding motion data) may be used.

Orientation information may reflect the orientation of content creation device 100, either independently or relative to an imaged environment or object. As one example of suitable orientation information that may be used, mention is made of gyroscope data reflecting the orientation of content creation device 100, e.g., when depth camera 120 and color camera record first and second frames, respectively. In such instances it may be understood that sensor(s) 106 may include a gyroscope. Of course the use of a gyroscope is for the sake of illustration only, and any suitable orientation sensor (and corresponding orientation data) may be used.

Of course location, motion, and orientation data are merely examples of types of contextual information, and it should be understood that any suitable contextual information may be used. For example, in some embodiments the contextual information includes or is in the form of user input data. In this context, user input data may refer to one or more user inputs received by content creation device (e.g., through a user interface thereof). For example, user inputs could be made when content creation device is located at an important location within an imaged environment, such as an access point (e.g., doorway, archway, etc.) thereof. As may be appreciated, such inputs may facilitate identifying the location of various objects and/or features of an imaged environment, particularly when such inputs are combined with other contextual information such as location, motion, and/or orientation data as noted above.

With the foregoing in mind, non-limiting examples of sensors that may be used as sensor(s) 106 include a global positioning system (GPS), an accelerometer, a gyroscope, a compass, a software sensor (e.g. to detect user inputs), combinations thereof, and the like. Without limitation, in some embodiments, sensor(s) 106 include at least a GPS, accelerometer, and a gyroscope.

Consistent with the foregoing, in operation sensors 106 may function to detect and provide contextual information to CCM 107, e.g., in one or more contextual information signals. In some embodiments, contextual information may be detected and provided as camera module 105 (or, more specifically, depth camera 120 and/or color camera 130) is used to image an environment and/or object. In this regard CCM 107 may be configured to register or otherwise align contextual information of sensor(s) 106 with first frames containing depth data and/or second frames containing color data, respectively.

For example CCM 107 may be configured to control the operation of camera module 105 and sensor(s) 106, such that camera module 105 collects image data (first frames, second frames, etc.) at substantially the same time that sensor(s) 106 collect and provide contextual information. As CCM 107 receives contextual information signals from sensor(s) 106, it may associate the contextual information therein with camera data (e.g., first frames containing depth data and/or second frames containing color data) received from camera module 105. For example, CCM 107 may associate contextual information with a corresponding first and/or second frame provided by camera module 105. In this context, a corresponding first or second frame should be understood as a first frame or a second frame that is received by CCM 107 at substantially the same time as CCM 107 receives the contextual information in question, e.g., from sensor(s) 106. In this regard the phrase "substantially the same time" means within a certain threshold time period, such as from about 1 to about 10 seconds, milliseconds, microseconds, or another suitable threshold.

In any case, CCM 107 may be configured to produce or cause the production of a data structure that links the contextual information provided by sensor(s) 106 with corresponding first frames, second frames, or a combination thereof. Without limitation, in some embodiments the data structure may be in the form of a linked list that temporally registers or otherwise links contextual information with corresponding first and second frames, as discussed above. As may be appreciated, CCM 107 may subsequently use such a data structure to identify contextual information associated with a particular first or second frame at a particular point in time.

In instances where the contextual information is or includes location information (e.g., the location of content creation device 100), CCM 107 may use such contextual information (either alone or in combination with other data such as depth data or disparity data) to determine the position of one or more objects within an imaged environment, the relative position of multiple objects in the imaged environment, combinations thereof, and the like. Moreover when the contextual information is or includes orientation information (e.g., the orientation of content creation device 100 at substantially the same time that first and/or second frames were recorded), CCM 107 may use such information to identify or otherwise determine an orientation of an imaged environment, an orientation of objects within an imaged environment, an orientation of content creation device 100 when depth, disparity, and/or color data was recorded, or a combination thereof. In some embodiments, CCM 107 may utilize location information, motion information, and orientation information to determine the relative position and orientation of an imaged environment, objects within an imaged environment, or a combination thereof, e.g., relative to content creation device 100. CCM 107 may also utilized depth data provided in one or more first frames from depth camera 120 to facilitate such a determination.

In some embodiments, CCM 107 may assign or otherwise associate location and/or orientation information with an imaged environment, objects within an imaged environment, or a combination thereof. For example and consistent with the foregoing described, CCM 107 may produce or cause the production of a data structure such as a linked list that registers location and/or orientation information with corresponding points in a 3D model of an environment, objects therein, or a combination thereof. Such a data structure may then be stored, e.g., as metadata in association with a 3D model of the environment/object produced by content creation device 100. As may be appreciated, such metadata may be used by CCM 107 to understand the perspective of recorded frames, the imaged environment, imaged objects, combinations thereof, and the like (e.g., relative to the content creation device at the time of recording), and to produce a 3D model that maintains that perspective. Moreover in some embodiments, CCM may use the metadata to understand the orientation and/or position of the imaged environment and/or objects therein, and to produce a 3D model of the imaged environment that maintains that orientation and/or position.

In some embodiments CCM 107 may also include or be in the form of hardware (e.g., circuitry), software, or a combination of hardware and software that is configured to detect access points of an imaged environment. As used herein, the term "access point" is used to refer to a point of entry and/or egress from an imaged environment. Non-limiting examples of access points include doorways, archways, hallways, windows, combinations thereof, and the like. Of course, other types of access points are contemplated and may be used in the context of the present disclosure. For the sake of illustration and ease of understanding, the following discussion will proceed on the basis of a use case in which CCM 107 may detect access points in the form of one or more doors in imaged environments, namely one or more rooms. It should be understood however that any suitable type of access point may be used/detected, in any suitable environment.

In this regard, as noted above CCM 107 may receive first frames containing depth data, and second frames containing color data from camera module 105. In some embodiments, CCM 107 may utilize one or more of such frames as an input image for the performance of access point detection operations consistent with the present disclosure. In some embodiments, such access point detection operations may include, for example, the performance of image processing operations by CCM 107 or another suitable component, such as process 101, a graphics processing unit (not shown) of content creation device 100, by a remote server (e.g., server 200 of FIG. 2), combinations thereof, and the like. Without limitation, in some embodiments such image processing operations may be or include the performance of one or more object detection operations on one or more input images.

For example, CCM 107 may receive first or second frames as described above in any suitable manner one or more of such frames may be selected by CCM 107 for use as an input image, e.g., for the performance of one or more object detection operations. As may be clear, one desired outcome of such operations is the production of an output that accurately identifies access points within the input image, and which correlates the identified access point(s) with corresponding point(s) (e.g., coordinates, vertices, etc.) of a 3D model of an imaged environment.

Accordingly, CCM 107 may be configured to perform one or more object detection operations on an input image. CCM 107 may therefore include one or more object detectors that may be generally configured to analyze an input image to detection regions that may contain an access point. For example, an object detector of CCM 107 may analyze or cause the analysis of an input image for visual cues that may be indicative of an access point. Non-limiting examples of such visual cues include but are not limited to structure (e.g, planes, segments, geometrical features, etc.), texture, and/or color associated with one or more pre-defined types of access points, such as doors, windows, archways, etc. In some embodiments, the object detector(s) within CCM 107 may give more or less weight to one or more of the above noted factors, e.g., to compensate for various factors that may affect the quality and/or suitability of the input image, such as movement of content creation device 100, noise, variable lighting, background interference, combinations thereof, and the like. For example in some embodiments the structure of an access point (as opposed to color and/or texture) may be weighted more heavily in the analysis of an input image for access points.

With the foregoing in mind, any suitable type of object detection paradigm may be employed by CCM 107. For example, CCM 107 may be configured to employ object detectors that utilize a scan stage, feature extraction stage, and classification stage to detect one or more access points in an input image. In some embodiments, CCM 107 may employ an object detector that includes or is in the form of an AdaBoost classifier, such as a Viola-Jones detector, which can detect objects in real-time. Without limitation, in some instances CCM 107 is configured to utilize a Viola-Jones detector to analyze input images for features that resemble Haar basis functions (hereinafter, "Haar-based features or Haar features"), and which may be correlated to an access point. It should be understood, however, that object detectors that analyze for other types of features (e.g., histogram oriented gradient (HOG) features, scale invariant feature transforms (SIFT), speeded up robust features (SURF), oriented first rotated brief (ORB) features, local binary patterns (LBP), planes, segments, combinations thereof, and the like) may also be used, e.g., in combination with various machine learning algorithms.

Figure 2:
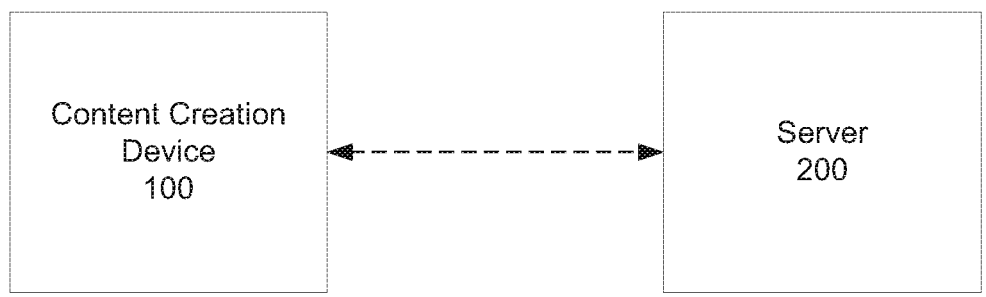
FIG. 2 depicts an example of a content creation system consistent with the present disclosure.

Regardless of the nature of the image analysis, CCM 107 may function to detect access points within an input image. When an access point is detected, CCM 107 may be configured to identify the access point in any suitable manner. For example CCM 107 may compare a detected access point to a database of known types of access points, which may be stored locally on or remote from content creation device 100. Content creation device 100 may therefore include an optional database (DB) 109, which in the embodiment of FIG. 1 is illustrated as being stored in memory 102. Of course, optional DB 109 need not be stored in memory 102, and may be stored in another manner. For example, optional DB 109 in some embodiments may be stored in a remote computing system, such as but not limited to server 200 as shown in FIG. 2. In such instances COMMS 104 may be configured to enable content creation device 100 to communicate with server 200 via a wired or wireless communications link that may be established using one or more pre-determined wired or wireless communications protocols.

More specifically, CCM 107 may be configured to perform or cause the performance of access point detection and identification operations. In some embodiments, such operations may include comparing information regarding access points detected in an input image/video to access points in optional DB 109. In instances where optional DB 109 is locally stored, CMM 107 may perform a direct comparison of the access point(s) detected in an input image to the objects/access points stored in DB 109. Alternatively in instances where DB 109 is stored on a remote computer system (e.g., server 200), CCM 107 may cause content creation device to transmit a data signal (object detection signal) containing information about access points detected in an input image/video to server 200. The object detection signal may be configured to cause server 200 to compare the information about access points detected in the input image/video to objects (e.g., pre-defined access points) in optional database 109, and to report a result to content creation device 100, e.g., in an object identification signal.

In either case if the comparison reveals a match between a detected access point in the input image and an access point stored in DB 109, CCM 107 may consider the detected access point to be a "true hit." If no match if found, however, CCM 107 may consider the detected access point to be a false positive and the hit (i.e., the detected access point in question) may be discarded. If a true hit is found, however, CCM 107 may be configured to correlate the detected access point with a corresponding portion of a 3D model of the imaged environment. In this regard, CCM 107 may identify depth and/or color data associated with an identified access point, and label or otherwise identify such data as corresponding to an access point. Likewise, CCM 107 may tag, label, or otherwise identify portions of a 3D model of an imaged environment as corresponding to an access point. Such tags, labels, etc. may for example be in the form of metadata, which may be associated with points (e.g., coordinates) of the 3D model corresponding to the identified access point. In some embodiments, such tags, labels, etc. may also identify the type of access point, as well as the location of the access point within the 3D model in question.

For the sake of clarity, points (e.g. coordinates, vertices, etc.) in a 3D model that are identified as corresponding to an access point may be referred to herein as "anchor points." As may be appreciated, once one or more anchor points is/are identified, CCM 107 may track the position of such anchor points regardless of the orientation and/or modification of the model.

While the above discussion has focused on the use of object detection to identify access points, it should be understood that CCM 107 may be configured to detect and/or identify other features of an input image (e.g., a first or second frame), and to associate such features with corresponding portions of a 3D model of an imaged environment. For example, CCM 107 may be configured to identify objects other than access points within an imaged environment, and to associate a model of such objects in a 3D model of an imaged environment with the determined identity of the object, and optionally with suitable object properties.

The nature in which CCM 107 may identify objects in an imaged environment is generally the same as how it may identify access points, and therefore such operations are not reiterated herein in detail. Generally, CCM 107 (or another suitable component of content creation device 100) may perform image processing operations on one or more input images (e.g., first frames, second frames, etc.).

As before, such image processing operations may include the performance of object detection operations on one or more input images. For example, CCM 107 may utilize an object detector to analyze an image for visual cues that may be indicative of one or more objects, such as the visual cues noted above. In any case, the image processing operations may be configured to account for variation factors that may affect the quality and/or suitability of an input image under consideration. Moreover, such object detector of CCM 107 may use any suitable object detection paradigm, such as those noted above. Without limitation, in some embodiments CCM 107 may employ an object detector that includes an object classifier such as an AdaBoost classifier.

Regardless of the nature of the image processing, CCM 107 may detect one or more within an input image. When an object is detected, CCM 107 may be configured to identify the detected object in any suitable manner. For example, CCM 107 may compare a detected object to a database containing a plurality of predefined objects, which may be stored locally or remote from content creation device 100, e.g., in optional database 109. In such instances, optional database 109 may include a plurality of predefined objects that may be cross referenced with identifying characteristics of such objects, and optionally with object properties of such objects. Non-limiting examples of such object properties include the dimensions of an object, physical properties of the object, the color of the object, combinations thereof, and the like. In any case if the comparison reveals a match is found between a detected object and an object in optional database 109, the detected object may be considered a true hit. Conversely if no match is found for the detected object, the detected object may be considered a false positive and discarded.

If a true his found, however, CCM 107 may be configured to identify points (e.g., coordinates, vertices, etc.) in a 3D model of the imaged environment that correspond to the detected object. For example, CCM 107 may identify depth and/or color data associated with an identified object, and label or otherwise identify such data as corresponding to the detected object. Likewise CCM 107 may tag, label, or otherwise identify portions of a 3D model of an imaged environment as corresponding to the identified object. Without limitation, in some embodiments such tags, labels, etc. may identify the type of object with which they are associated. Alternatively or additionally, such tags, labels, etc. may also identify object properties associated with the object. In such instances, CCM 107 may obtain object properties from optional database 109 or another suitable source, and add such properties to a tag, label, etc. associated with one or more portions of a 3D model of an imaged environment, e.g., as metadata. This may allow CCM 107 to automatically assign object properties to detected objects, with the need for human involvement. As may be appreciated, this may alleviate or even remove the need for the exertion of significant effort (e.g., by computer graphics artists) to manually associate a 3D model of an object with one or more object properties.

In addition to identifying or causing the identification of objects within an imaged environment, CCM 107 may also be configured to segment detected objects within a 3D model of an imaged environment. In this context, the terms "segment" and "segmentation" are used interchangeably to refer to operations in which a 3D model of an object detected in an imaged environment is separated from a 3D model of the imaged environment as a whole. For example, consider a use case in which CCM 107 generates a 3D model of an imaged environment that includes a model of a painting hanging on a model of a wall in a room. In that instance, CCM 107 may perform image processing operations to detect and identify the painting in the imaged environment, and to identify the painting (and, perhaps, the wall), in a 3D model of the imaged environment, as described above. At that point, CCM 107 may perform one or more segmentation operations on the 3D model of the environment to separate the model of the painting from the model of the wall, such that the painting may be represented as a 3D model that is distinct from other components of the 3D model of the imaged environment, most notably the wall.

In this regard CCM 107 may employ any suitable segmentation technique to segment identified objects within a 3D model of an imaged environment. Non-limiting examples of such techniques include shape-based retrieval techniques, metamorphosis techniques, simplification techniques, 3D segmentation using a codebook model, 3D mesh segmentation, foreground-background segmentation, combinations thereof, and the like. In the painting and wall embodiment for example, one or more segmentation techniques (e.g. foreground-background segmentation) may be used to isolate a 3D mesh model of the painting from a 3D mesh model of the background. The segmentation may be guided by measurements taken from the depth data, color data, etc., provided by camera module 105, and or which may be associated or otherwise derived from object properties (e.g., dimensions) stored in optional database in associated with a predefined object that was determined to correspond to the painting. In any case, the result of the segmentation operation(s) may be the production of a 3D model of the painting that is distinct from the remainder of the 3D model of the imaged environment, and most notably the wall.

In some embodiments, after one or more segmentation operations CCM 107 may be configured to update the 3D model of other objects in the imaged environment. In the context of the painting and wall embodiment for example, segmentation of the painting from the wall may leave a void in the mesh model of the wall in the region behind the painting. With this in mind, CCM 107 may perform one or more model update operations to fill in such voids or other defects, which may result from segments. Any suitable update technique may be used for this purpose. For example, CCM 107 in some embodiments may employ a fill algorithm, the execution of which may fill one or more voids or other defects in a 3D model. The fill algorithm may in some embodiments fill such voids/defects by determining features and/or characteristics of one or more regions adjacent an edge of the void/defect, and filling in the void/defect based at least in part on such features. In the painting and wall example, for instance, CCM 107 may execute a fill or interpolation algorithm that determines the features/characteristics of the model of the wall adjacent an edge of the painting, and updates the 3D model (e.g. mesh model) of the wall to fill in the region behind the painting with a mesh or other model having substantially the same features/characteristics as the portion of the model of the wall adjacent the edge of the painting.

Figure 3:
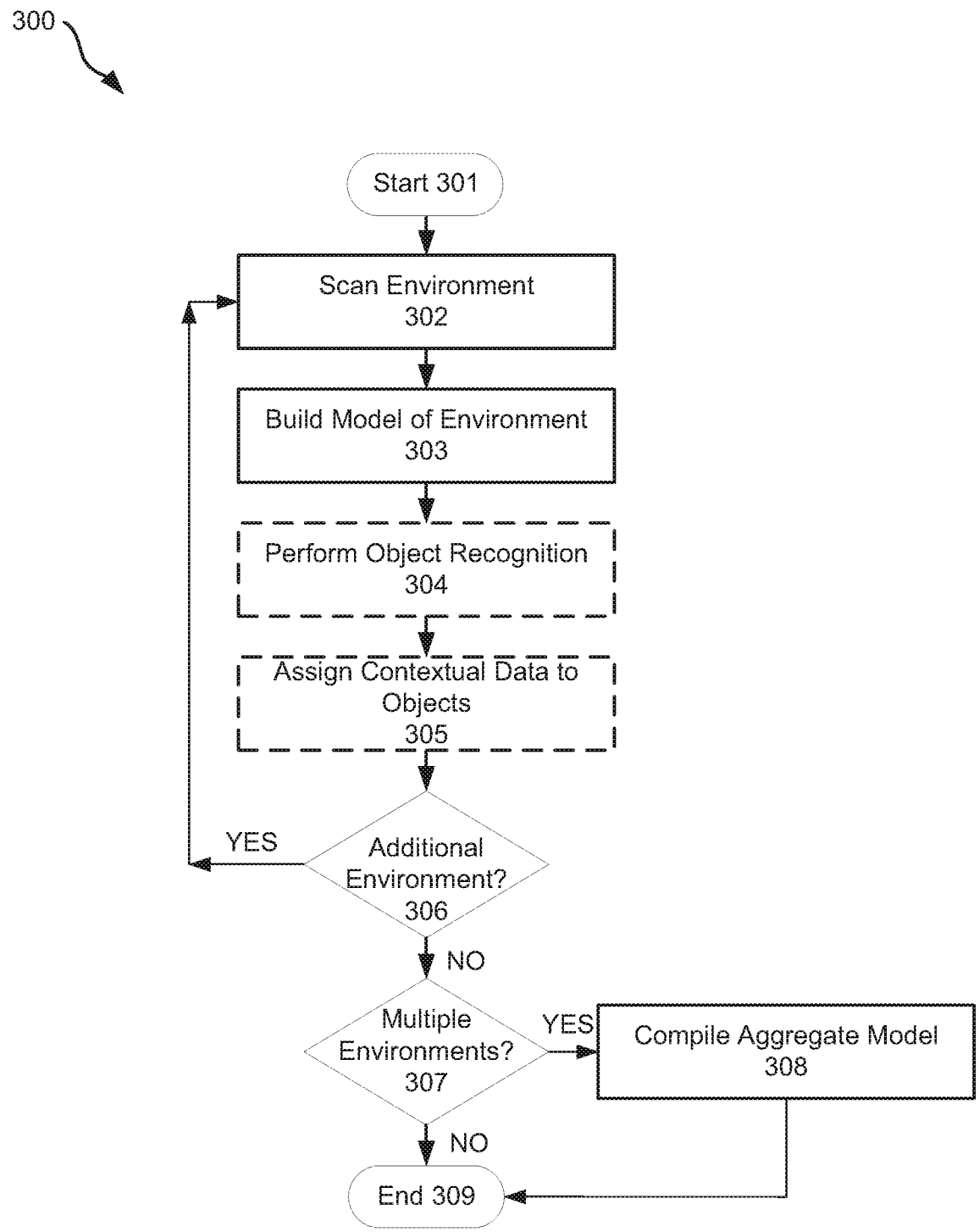
FIG. 3 is a diagram of example operations in accordance with one example of a method of generating a 3D model, consistent with the present disclosure.

Another aspect of the present disclosure relates to methods for producing 3D models. In this regard reference is made to FIG. 3, which is a flow diagram of example operations of one embodiment of a method of generating a 3D model consistent with the present disclosure. As shown, model 300 begins at block 301. The method may then proceed to block 302, pursuant to which a content creation device may be used to scan/image an environment, such as a room. The manner in which the environment may be scanned is the same as described above in connection with the operation of content creation device 100, and therefore is not reiterated.

Once an environment has been scanned/imaged, the method may proceed from block 302 to block 303. Pursuant to block 303, the content creation device may build a 3D model of the environment based at least in part on depth data and color data, as noted above. Points in the 3D model may be associated with contextual information based at least in part on inputs from one or more sensors, e.g., location information, orientation information, and the like. Likewise at this stage, image processing or other operations may be performed to identify access points and to tag, label, or otherwise identify such points as anchor points in the 3D model of the imaged environment.

The method may then proceed to option blocks 304, wherein object recognition and/or segmentation may be performed. The nature of such operations is described above and is therefore not reiterated in detail. If object recognition is performed, objects may be detected in the imaged environment using one or more object detection paradigms, and operations may be performed to identify any detected objects as described above. If an object is detected object and identified, the method may further include tagging, labeling, or otherwise identifying a portion of the 3D model of the imaged environment corresponding to the identified object with appropriate identification indicia. Furthermore the identified object may optionally be segmented from other portions of the 3D model of the imaged environment, and represented as a discrete 3d model.

Provided object detection is performed and at least one object is detected and identified, the method may proceed to optional block 305, wherein object properties may be associated with an identified object in the 3D model of the imaged environment. The manner in which this may be performed has been described previously, and thereof is not reiterated in detail. In some embodiments, operations pursuant to block 305 may include assigning object properties from a database to an identified object, wherein the database is structured so as to cross reference a plurality of predefined objects with corresponding object properties.

If object recognition is not performed or object detection is performed by no objects are detected, the method may proceed from block 303 or block 304 to block 306. Pursuant to block 306, a determination may be made as to whether an additional environment is to be scanned/imaged. If so, the method may loop back to block 302. But if not, the method may proceed to block 307, pursuant to which a determination may be made as to whether multiple environments have been scanned/imaged and modeled. If so, the method may proceed to block 308, pursuant to which an aggregate model may be compiled from a plurality of constituent 3D models, as described later. If not, the method may proceed to block 309 and end.

As described above, the technologies of the present disclosure may produce or cause the production of a 3D model of an environment, wherein all or a portion of the model is associated with contextual information such as location information and/or orientation information, and wherein access points in the imaged environment are identified in the 3D model thereof as one or more anchor points. With this in mind, another aspect of the present disclosure relates to technologies for producing an aggregate model from a plurality of discrete 3D models, which for the sake of clarity are referred to herein individually and collectively as a "constituent model" or "constituent models."

As used herein, the term "aggregate model" refers to a 3D model that may be produced by combining multiple constituent 3D models that are discrete (i.e., separate) from one another. By way of example, the technologies described herein may function to combine a first (constituent) 3D model of a first environment (e.g., a first room) with a second (constituent) 3D model of a second environment (e.g., a second room), so as to produce an aggregate 3D model that combines the 3D model of the first environment with the 3D model of the second environment. Of course, more than 2 constituent 3D models may be combined to form an aggregate model. Indeed the present disclosure envisions embodiments wherein 2, 3, 4, 5, 10, 15, 20, 25, 100, or more constituent 3D models may be combined to form an aggregate model For the sake of illustration, the present disclosure will now proceed to describe various embodiments in which CCM 107 operates to generate an aggregate model from two or more constituent models. It should be understood that this discussion is for the sake of illustration, and that such operations need not be performed by CCM 107. Indeed the present disclosure envisions embodiments wherein a component other than CCM 107 (e.g., a graphics processing unit) may be used to generate an aggregate model from a plurality of constituent 3D models.

In some embodiments, CCM 107 may function to perform one or more aggregate model generation operations consistent with the present disclosure. In some embodiment such aggregate model operations may include accessing at least a first constituent 3D model and a second constituent 3D model, analyzing the first and second constituent 3D models to identify anchor points therein, and combining the first constituent 3D model with the second constituent 3D model such that at least one first anchor point of the first constituent 3D model is substantially aligned with least one second anchor point of the second constituent 3D model. In this context, the term "substantially aligned" may be understood to mean that greater than 95% of the points (e.g., coordinates) of a model of a first access point in a first constituent 3D model overlap with the points e.g., coordinates) of a model of a second access point in a second constituent 3D model. Without limitation, in some embodiments CCM 107 may function to produce an aggregate model in which points of one or more access points in a first constituent 3D model identically overlaps with points of one or more second access points in a second constituent 3D model.

In some embodiments, CCM 107 may utilize contextual information associated with anchor points of the first and second constituent 3D models to facilitate combining such models such that the anchor points substantially overlap. In particular, CCM 107 may analyze contextual information associated with the anchor points of each of the first and second constituent 3D models. CCM 107 may then compare the contextual information of each anchor point of the first constituent 3D model with the contextual information of each anchor point of the second constituent 3D model and, based on that comparison, determine how the first and second constituent 3D models may be combined.

For example, as noted above the technologies described herein may produce 3D models in which location and/or orientation information may be associated (e.g., as contextual information) with the anchor points of the 3D model. In such instances, CCM 107 may compare location and/or orientation information associated with each anchor point of a first constituent 3D model to location and/or orientation information associated with each anchor point of a second constituent 3D model. Based on that comparison, CCM 107 may choose to align one of the anchor points of the first constituent 3D models with one of the anchor points of the second constituent 3D models. For example in the case of location information, CCM 107 may determine whether the location of any of the anchor points of a first constituent 3D model is within a threshold distance of the location of any of the anchor points of a second constituent 3D model. If so, CCM 107 may combing the first and second constituent 3D models such that those particular anchor points are substantially aligned with one another. CCM 107 may then combine the first and second constituent 3D models, e.g., by joining them at the substantially aligned anchor points. For example when the first and second constituent 3D models are mesh models, CCM 107 may combine join the mesh of the first constituent 3D model with the mesh of the second constituent 3D model, e.g., at the substantially aligned anchor points.

When orientation information is associated with an anchor point, such information may be used to facilitate the combination of multiple constituent 3D models into an aggregate model. For example, CCM 107 utilize orientation information to determine the relative orientation of one or more anchor points in a first constituent 3D model to one or more anchor points of a second constituent 3D model. Based on the relative orientation of such anchor points, CCM 107 may perform a model update operation to one or more of the constituent 3D models, such that at least one anchor point of the first constituent 3D model is oriented in substantially the same direction as at least one anchor point of the second constituent 3D model. In such instances (and optionally guided by location information as discussed above), CCM 107 may combine the first and second constituent 3D models such that the commonly oriented anchor point(s) of the first and second constituent 3D models are substantially aligned. Thereafter, model update operations may be performed to join the first constituent 3D model (e.g., a mesh thereof) to the (e.g., mesh of the) second constituent 3D model (e.g., at the substantially aligned anchor points.

As may be appreciated, CCM 107 may have a significant amount of flexibility in determining how to align and/or combine a plurality of constituent 3D models. For example, CCM 107 may be configured in some embodiments to produce an aggregate model from a plurality of constituent 3D models, wherein the constituent 3D models are arranged/combined in the aggregate model the same manner as the arrangement of their real world counterparts. Alternatively, in some embodiments CCM 107 may be configured to produce an aggregate 3D model from multiple constituent 3D models, wherein the constituent 3D models are arranged/combined in the aggregate model in a manner that differs from the arrangement of their real world counterparts. In either case, CCM 107 may function to produce an aggregate model in which one or more access points of the constituent models used therein are substantially aligned, as discussed above.

For the purpose of clarity, the present disclosure will now describe two use cases in which CCM 107 operates to combine a plurality of constituent 3D models so as to form multiple different aggregate models. With this in mind, reference is now made to FIG. 4A, which depicts one example of a real world arrangement of three environments, 401, 402, 403. In this case environments 401, 402, 403 may be understood as rooms, but it should be understood that any suitable environment may be used.

Figure 4A:
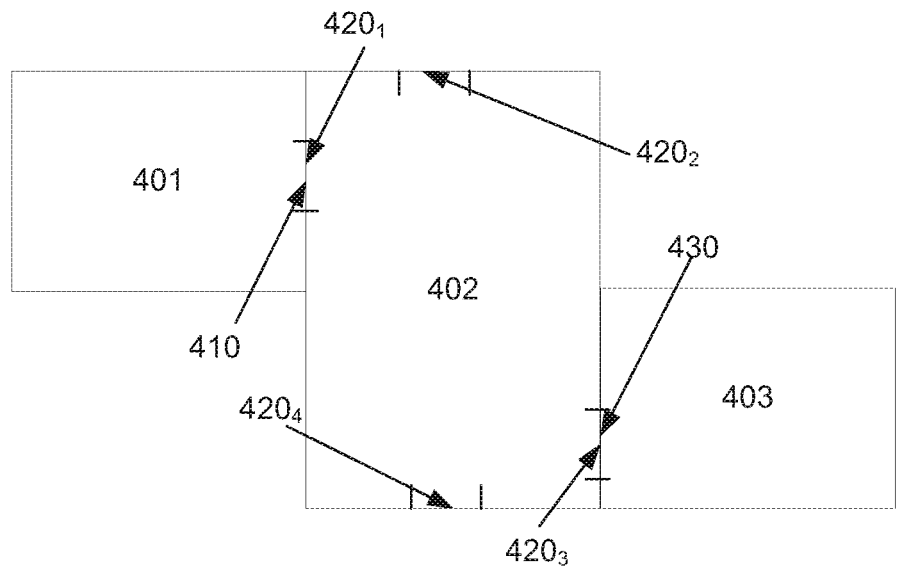
FIGS. 4A-4D depict examples of how a plurality of 3D models may be compiled into an aggregate 3D model, consistent with the present disclosure.

As shown in FIG. 4A, environment 401 has a rectangular shape with a long dimension running left to right. A single access point (e.g., a door) 410 is present in the right wall of environment 401. In contrast, environment 402 has a rectangular shape with a long dimension running from top to bottom. Moreover, multiple access points $420_1$-$420_4$ are present in environment 402, with one access point being located within each wall thereof. Environment 403 is similar to environment 401, except that it includes an access point (door) 430 that is formed in its left wall at a location that differs from that of access point 410 of environment 401.

Figure 4B:
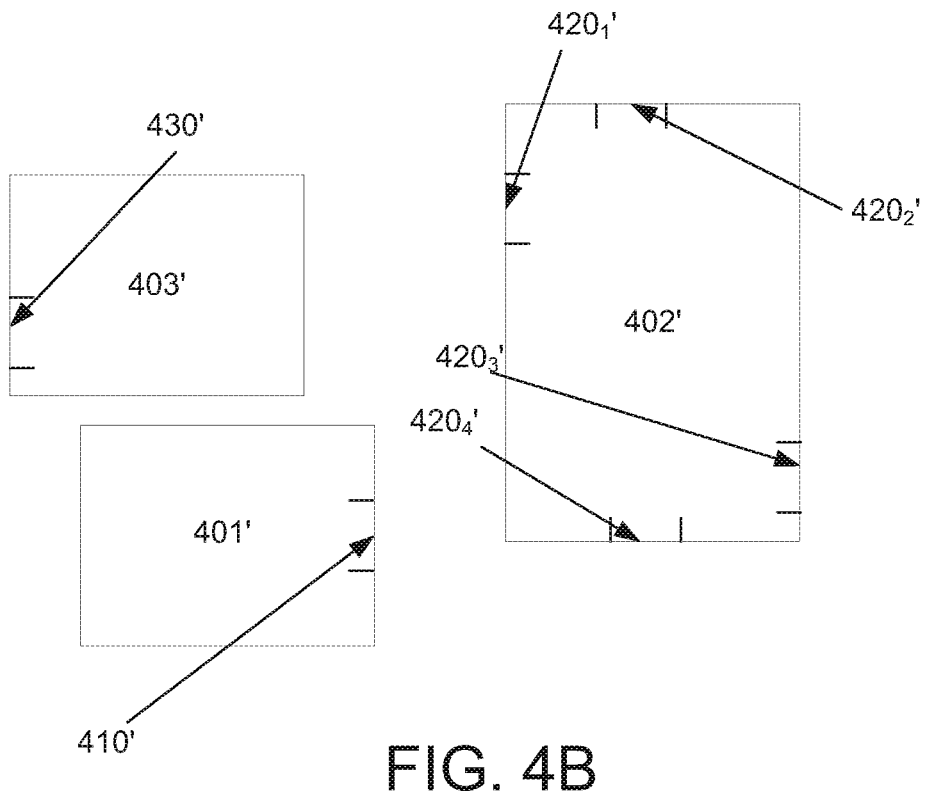

With the foregoing in mind, content creation device 100 may be employed to generate distinct 3D models of each of environments 401, 402, and 403, as generally described above. That is, camera module 105 may be used to collect depth and color data of each of environments 401, 402, 403, e.g., as content creation device 100 is moved within each environment. At substantially the same time, contextual information (e.g., location information, motion information etc.) may be collected by sensor(s) 106. The depth data, color data, and contextual information may then be provided to CCM 107, which may use such data to produce constituent 3D models 401', 402', 403', as illustrated in FIG. 4B and in the manner previous described. CCM 107 may then perform access point detection operations on input images (e.g. depth data, sensor data, etc.) and/or constituent 3D models 401', 402', 403', resulting in the identification of access points 410, $420_{1-4}$, and 430. CCM 107 may then tag, label, or otherwise identify the identified access points as anchor points 410', $420_{1-4}'$, and 430', as shown in FIG. 4B. After that point, CCM 107 may perform aggregate model generation operations to combine models 401', 402', 403', as generally described above.

For example, in some embodiments CCM 107 may be configured to generate an aggregate model simulating the real world arrangement of environments 401, 402, and 403, based at least in part on a comparison of contextual information associated with each of the anchor points identified in models 401', 402', and 403'. In this embodiment for example, CCM 107 may determine that location information associated with anchor point 410' of model 401' is within a threshold distance of the anchor point $420_1'$ of model 402'. In such instances, CCM 107 may then substantially align anchor point 410' with anchor point $420_1'$, and perform model update operations to join (e.g., the mesh of) model 401' with model 402' at those anchor points. In some embodiments, CCM 107 may align anchor points among two or more constituent 3D models based at least in in part on a comparison of orientation information associated with such anchor points. For example, CCM 107 may analyze orientation information associated with two or more anchor points of differing constituent 3D models to determine whether the anchor points are oriented in the same direction. If the two anchor points are commonly oriented, CCM 107 may proceed to align the anchor points by bringing them into close proximity with one another, such that they touch or overlap one another. If the two anchor points are not commonly oriented, however, CCM 107 may reorient one or both of the constituent 3D models in question relative to other to compensate for any difference in the orientation of the constituent 3D models, after which the models may be aligned as described above.

Figure 4C:
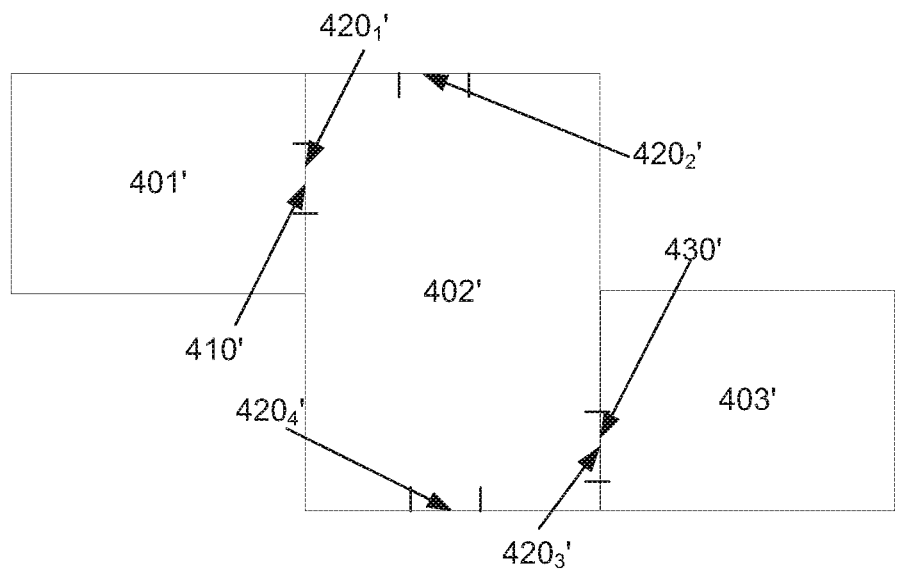

Returning to the illustrative embodiment, CCM 107 may perform similar operations to identify that anchor points $420_3'$ and 430' are within a threshold distance, and/or are aligned in substantially the same direction. CCM 107 may then substantially align anchor point $420_3'$ with anchor point 430', and perform model update operations to join (e.g., the mesh of) model 402' with model 403' at those anchor points. The result may be the production of an aggregate model 450 in which models 401', 402', and 403' are arranged in the same manner as environments 401, 402, and 403, with the models being joined to one another at the relevant access points, as shown in FIG. 4C.

In other embodiments CCM 107 may be configured to generate an aggregate model from a plurality of constituent 3D models, wherein the constituent 3D models in the aggregate model are arranged in a manner that differs from their real world counterparts. As in the prior example embodiment, content control device may be used to image environments 401, 402, 403 and produce constituent models 401', 402', 403' thereof. All or a portion of the points (e.g. vertices) of models 401', 402', 403' may be associated with contextual information, object properties, and the like, as previously described. Moreover, anchor points in each model may be tagged or otherwise identified in each model, as previously described.

With the foregoing in mind, CCM 107 may analyze each constituent 3D model to be included in the aggregate model to identify the anchor points therein. Thus in this example, CCM 107 may analyze metadata, tags, etc. associated with the anchor points of each of models 401', 402', and 403'. CCM 107 may then combine any two anchor points from different constituent 3D models. For example, CCM 107 may select one anchor point of model 402' to join with anchor point 430' of model 403', and another anchor point of model 402' to join with anchor point 420' of model 402'.

The manner in which the anchor points may be selected for combination is not limited, and may be accomplished in any manner. For example, anchor points may be selected based on a user profile, an algorithm, the output of a random number generator, the relative size of the constituent models to be included in the aggregate model, the orientation of such models and/or the objects contained therein, combinations thereof, and the like. In some embodiments, CCM 107 may function to select anchor points for combination based at least in part on the geometry of the constituent 3D models to be included in the aggregate model, the orientation of the constituent 3D models, the orientation of identified objects in the constituent 3D models, combinations thereof, and the like. Without limitation, CCM 107 in some embodiments selects anchor points for combination such that one constituent 3D model does not overlap or otherwise conflict with another constituent 3D model. CCM 107 may then align the selected anchor points and join their respective constituent 3D models in much the same manner as noted above. Notably, CCM 107 or another component of content creation device 100 may reorient or otherwise rearrange one or more or the constituent 3D models and/or objects therein to facilitate the combination of the selected anchor points.

Figure 4D:
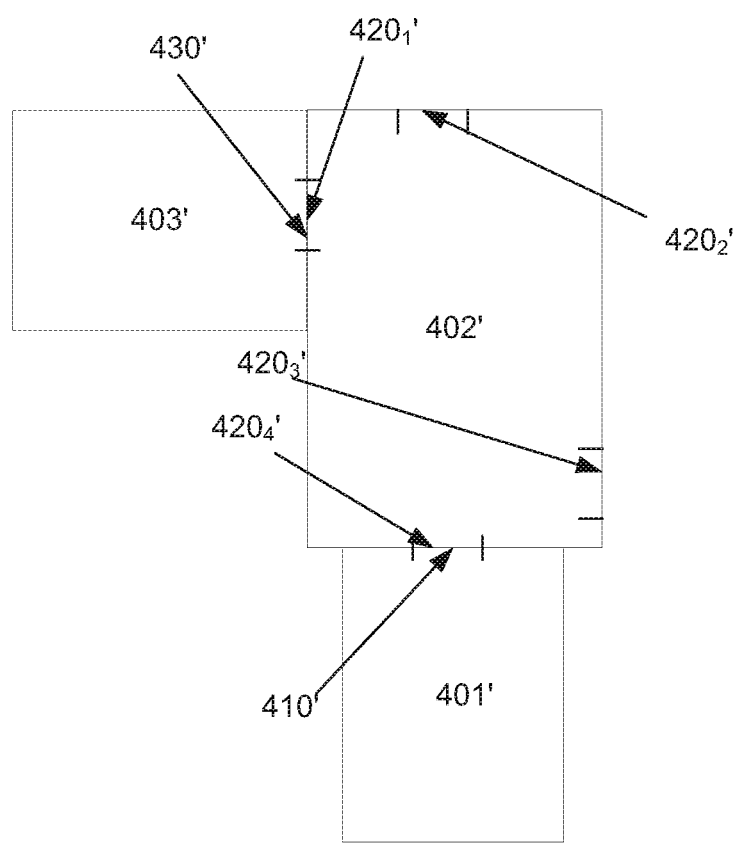

To illustrate this concept reference is made to FIG. 4D, which depicts an aggregate model that is constructed from the same constituent 3D models as the aggregate model of FIG. 4C, but wherein the constituent 3D models are arranged in a manner that differs from their real world counterparts. More specifically, in this embodiment CCM 107 has selected anchor point 430' of model 403' for combination with anchor point 420$_1$' of model 402', and anchor point 420$_4$ of model 402' for combination with anchor point 410' of model 401' for combination. As may be appreciated, the orientation of models 401' and 403' in FIG. 4D is different from the orientation of such models in FIG. 4B. It may therefore be understood that prior to combining such models with model 402' at the selected anchor points, CCM 107 may have reoriented or otherwise rearranged models 401', 402', and/or 403' relative to one another, until the selected anchor points of each model are oriented properly with regard to one another. At that point, CCM 107 may align and join the models in substantially the same manner as previously described.

As described above, the technologies of the present disclosure may facilitate the production of 3D models of real world environments. Such 3D models may be used independently for a variety of purposes, or they may be combined to form one or more aggregate models. As may be appreciated, such models may have applications in a wide variety of use cases, such as but not limited to the development of virtual spaces for use in video games, virtual reality experiences, combinations thereof, and the like. Alternatively or additionally, because the 3D models described herein may associate contextual information, object properties, etc., they may also have use in virtual histories, e.g., where a history of a particular object may be recorded/developed from multiple scans/3D models of the same environment developed over time.

In the context of video games and virtual devices, for example, the content creation devices described herein may be employed to generate 3D models of a real world location, such as but not limited to a user's home. For example, a content creation device may be used to image each room in a user's home, and then generate a corresponding 3D model of such rooms. As generally described above, contextual information such as location information, orientation information, etc., may be associated with all or a portion of the 3D model. In addition, objects within the imaged environment may be identified, segmented, and autonomously associated with relevant object properties, e.g., by retrieving such properties from a local or remotely stored database, and associated those properties with segmented objects within the 3D model of a room.

Consistent with the foregoing description, a content creation module may then be used to generate an aggregate model of the imaged environments, wherein the aggregate model accurately reflects the arrangement of rooms, spaces, etc., in the imaged environment, in this case a user's home. Alternatively, the content creation module could be used to produce an aggregate model in which the models of the rooms are arranged in a manner that differs from the arrangement of real world counterparts. In such instances, the arrangement of the modeled rooms may change each time the aggregate model is generated, e.g., so as to provide a dynamic experience for the user each time the aggregate model is used as a game environment.

Figure 5:
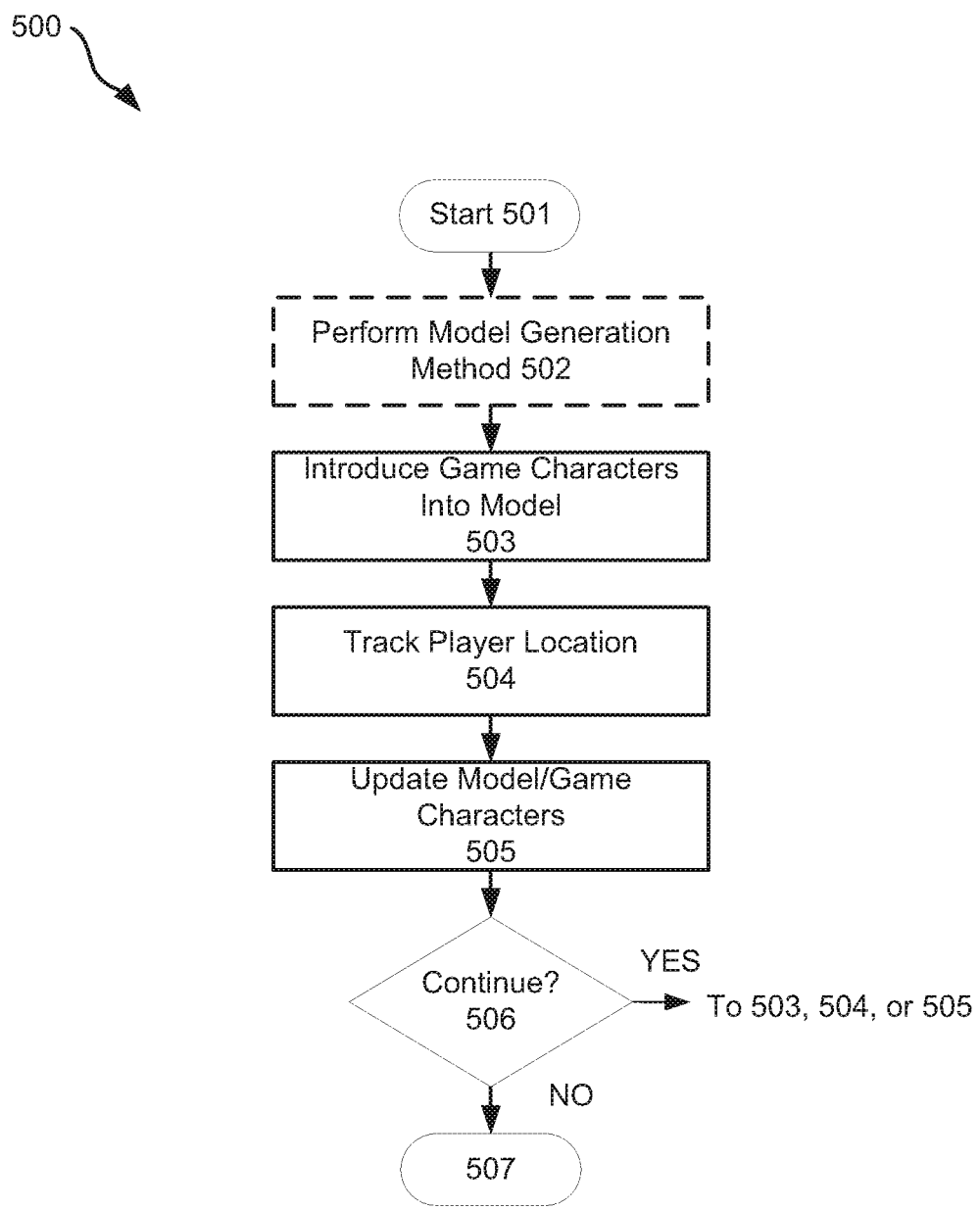
FIG. 5 is a diagram of example operations in accordance with one example of a method of producing a video game with a content creation device, consistent with the present disclosure.

Turning now to FIG. 5, another aspect of the present disclosure relates to generating and modifying an aggregate model, e.g., for use as a video game environment. As shown the method 500 begin at block 501. If a 3D model consistent with the present disclosure has not been generated, the method may proceed to optional block 500, pursuant to which the model generation method of FIG. 3 may be performed. Once a 3D model has been generated (or if a 3D model is previously available), the method may proceed to block 503.

Pursuant to block, game characters may be introduced into the 3D model, e.g., by CCM 107, another component of content creation device 107, and/or by a component of a remote device, such as server 200. Any suitable game characters may be used, as generally understood in the art. Alternatively or additionally, game characters may be derived from objects, persons, pets, etc. imaged by the content creation device, e.g., during the creation of all or a portion of the 3D model used as the video game world. For example where a user's dog is present in a room when it is imaged by a content creation device consistent with the present disclosure, the dog may be identified, e.g., by the user or via the execution of object/image recognition operations. A 3D model of the imaged entity (in this case, the dog) may then be created and segmented (if necessary) from the other elements of the 3D model.

The 3D model of the imaged entity may then be stored local or remotely from content creation device 100, e.g., in character store. The character store may be present, for example, as a data structure stored in a memory of content creation device 100, server 200, or in another suitable location. Furthermore while the foregoing description focused on the generation of one character model from an image of a dog, it should be understood that any number of character models may be generated and stored in the character store. Moreover it should be understood that the characters in the character store need not be derived from images captured by content creation device 100, and may be generated in another manner, such as by a computer graphics artist using traditional means.

In any case, CCM 107 or another component of content creation device 100 may insert characters from the character store into a 3D model (e.g., an aggregate model), to provide a desired user experience. For example, CCM 107 or another component of content creation device 100 may insert characters from the character store to serve as non-player characters (e.g., allies, adversaries, etc.), which may be interacted with by a user of content creation device 100.

Returning to FIG. 5, once game characters are introduced the method may proceed to element 504, pursuant to which the player's location may be tracked. In this regard, it may be understood that content creation device may form all or part of a wearable device that may be used to provide a gaming experience to a user. For example the 3D model used as the game world may be rendered on optional display 103, and may change as a user moves with content creation device 100. Put in other terms, in instances where the 3D model is of a user's home, the user may interact with that model by moving with content creation device throughout his home. As the user (or, more specifically, content creation device 100) moves, the 3D model of the user's home may be displayed and updated on optional display 103. GPS or other location sensors (e.g., WIFI sensors) may be used to track the player's location within the player's home, and update the rendering of the 3D model on optional display 103 accordingly.

The method may then proceed to block 505, pursuant to which the 3D model/game characters may be updated, e.g., in response to user interaction. For example, a user may interact with the 3d model/game characters via a graphical user interface, one or more interface devices (e.g., game controllers), combinations thereof, and the like. The result of such interaction may be the alteration of the 3D model, a state of one or more game characters, etc. Pursuant to method 500, CCM 107, another component of content creation device 100, or a component of server 200 may update the 3D model, game characters, etc., in response to the user interaction, so as to provide a desired user experience.

The method may then proceed to block 506, pursuant to which a determination may be made as to whether the method is to continue. If so, the method may loop back to block 503, 504, or 505, as desired. But if not, the method may proceed to block 507 and end.

EXAMPLES

The following examples enumerate additional non-limiting embodiments of the present disclosure.

Example 1

According to this example there is provided content creation device including a processor, a memory, a camera module, and a content creation module (CCM), wherein: the camera module includes a depth camera to obtain depth data of a real world environment and a visual camera to obtain color data of the real world environment; and the CCM includes circuitry to: produce a three dimensional model of the real world environment based at least in part on the depth data; analyze at least one of the depth data and color data to detect one or more access points in the real world environment; and correlate a portion of the three dimensional model with a detected access point.

Example 2

This example includes any or all of the features of example 1, and further includes at least one sensor to obtain contextual information, wherein the CCM is further to correlate the contextual information with the portion of the three dimensional model corresponding to a detected access point.

Example 3

This example includes any or all of the features of example 2, wherein the at least one sensor includes one or more of a gyroscope, a global positioning sensor, or an accelerometer.

Example 4

This example includes any or all of the features of example 3, wherein: the at least one sensor is a global positioning sensor; and the contextual information includes location information.

Example 5

This example includes any or all of the features of any one of examples 1 to 4, wherein: the depth data is stored in one or more first frames in the memory; the color data is stored in one or more second frames in the memory; and the CCM is to detect the one or more access points at least in part by executing image processing operations on at least one of the first or second frames.

Example 6

This example includes any or all of the features of example 5, wherein the CCM is further to identify a type of the detected access point.

Example 7

This example includes any or all of the features of example 6, wherein: the image processing operations comprise performing object detection on at least one of the first or second frames; the CCM is further to identify the type of the detected access point at least in part by comparing an output of the object detection operations to a database of predefined access points.

Example 8

This example includes any or all of the features of example 7, wherein the database of predefined access points is stored in the memory or maintained remotely from the content creation device.

Example 9

This example includes any or all of the features of any one of examples 1 to 4, wherein: the CCM is further to analyze at least one of depth data and color data to detect an object within the real world environment; and the three dimensional model includes a representation of a detected object within the real world environment.

Example 10

This example includes any or all of the features of example 9, wherein: the depth data is stored in one or more first frames in the memory; the color data is stored in one or more second frames in the memory; and the CCM is to detect the objects at least in part by executing image processing operations on at least one of the first or second frames.

Example 11

This example includes any or all of the features of example 10, wherein the CCM is further to identify a detected object in the real world environment.

Example 12

This example includes any or all of the features of example 11, wherein: the image processing operations comprise performing object detection on at least one of the first or second frames; and the CCM is to identify a detected object at least in part by comparing an output of the image processing operations to a database of predefined objects.

Example 13

This example includes any or all of the features of example 11, wherein:
the CCM is further to determine object parameters corresponding to an identified detected object; and correlate the object parameters with a representation of an identified detected object in the three dimensional model.

Example 14

This example includes any or all of the features of example 11, wherein the CCM is to determine the object parameters based at least comparison of an identified object to a database correlating a plurality of predefined objects with corresponding object parameters.

Example 15

This example includes any or all of the features of example 11, wherein the CCM is further to perform segmentation operations on the three dimensional model to segment a representation of the identified object in the three dimensional model from the remainder of the three dimensional model.

Example 16

This example includes any or all of the features of example 15, wherein the segmentation operations result in a void in the three dimensional model, and the CCM is further to perform model update operations to fill in the void.

Example 17

This example includes any or all of the features of any one of examples 1 to 4, wherein: the CCM is further to combine a plurality of constituent three dimensional models to produce an aggregate model, the plurality of constituent three dimensional models including a first constituent model of a first real world location and a second constituent model of a second real world location, the first and second real world locations being arranged in a real world arrangement; and in the aggregate model, the first and second constituent models are arranged in substantially the same manner as the real world arrangement.

Example 18

This example includes any or all of the features of example 17, wherein: the first and second constituent models comprise first and second mesh models, respectively; and the CCM is further to combine the plurality of constituent three dimensional models at least in part by combining a mesh of the first mesh model with a mesh of the second mesh model.

Example 19

This example includes any or all of the features of example 17, wherein: the first constituent model is associated with first metadata identifying one or more first anchor points in the first constituent model, each first anchor point corresponding to an access point in the first real world location; the second constituent model is associated with second metadata identifying one or more second anchor points in the second constituent model, each second anchor point corresponding to an access point in the first real world location; and the CCM is further to produce the aggregate model at least in part by joining at the first and second constituent models, such that in the aggregate model a first anchor point of the first constituent model is substantially aligned with a second anchor point of the second constituent model.

Example 20

This example includes any or all of the features of example 19, wherein: the first constituent model includes a plurality of first anchor points; and the CCM is further to combine the plurality of constituent models such that in the aggregate model, a selected one of the plurality of first anchor points is substantially aligned with a second anchor point of the second constituent model.

Example 21

This example includes any or all of the features of example 20, wherein: each of the plurality of first anchor points of the first constituent model is associated with first contextual information; each second anchor point of the second constituent model is associated with second contextual information; and the CCM is further to identify the selected one of the plurality of first anchor points based at least on a comparison of the first contextual information of each of the plurality of first anchor points with second contextual information associated with each second anchor point.

Example 22

This example includes any or all of the features of example 21, wherein the contextual information includes location information.

Example 23

This example includes any or all of the features of example 22, wherein the location information specifies a real world location of each of the first and second anchor points.

Example 24

This example includes any or all of the features of example 23, wherein the CCM is further to identify the selected one of the plurality of first anchor points based at least in part on a determination that a first anchor point is within a threshold distance of a second anchor point.

Example 25

This example includes any or all of the features of example 21, wherein the contextual information further includes orientation information, the orientation information specifying an orientation of a corresponding one of the first and second anchor points.

Example 26

This example includes any or all of the features of example 25, wherein the CCM is to identify the selected one of the plurality of first anchor points based at least in part on a determination that a first anchor point is within a threshold distance of a second anchor point.

Example 27

This example includes any or all of the features of example 26, wherein the CCM is further to determine whether the orientation of the selected one of the plurality of first anchor points is the same as the second anchor point and, if not, to reorient at least one of the first constituent model and the second constitute model.

Example 28

This example includes any or all of the features of example 21, wherein the CCM is to identify the selected one of the plurality of first anchor points such that in the aggregate model, one or more of the plurality of constituent three dimensional models does not conflict with another of the plurality of constituent three dimensional models.

Example 29

This example includes any or all of the features of example 17, wherein: the aggregate model is a video game world; and the CCM is to introduce video game characters into the video game world.

Example 30

According to this example there is provided a method for producing a three dimensional model, including, with a content creation device: producing a three dimensional model of a real world environment based at least in part on depth data of the real world environment; analyzing at least one of the depth data and color data of the real world environment to detect one or more access points in the real world environment; and correlating a portion of the three dimensional model with a detected access point.

Example 31

This example includes any or all of the features of example 30, wherein the method further includes correlating contextual information of at least one sensor with the portion of the three dimensional model corresponding to a detected access point.

Example 32

This example includes any or all of the features of example 31, wherein the contextual information includes at least one of orientation information, location information, or accelerometer information.

Example 33

This example includes any or all of the features of example 30, wherein the contextual information includes location information.

Example 34

This example includes any or all of the features of any one of examples 30 to 33, wherein the method further includes obtaining the depth data in one or more first frames with a depth camera; and obtaining the color data with one or more second frames with a visual camera; wherein the analyzing at least one of the depth data and color data includes executing image processing operations on at least one of the first or second frames.

Example 35

This example includes any or all of the features of example 34, wherein the method further includes identifying a type of the detected access point.

Example 36

This example includes any or all of the features of example 35, wherein: the image processing operations comprise performing object detection on at least one of the first or second frames, and the identifying is performed at least in part by comparing an output of the object detection operations to a database of predefined access points.

Example 37

This example includes any or all of the features of example 36, wherein the database of predefined access points is stored in a memory of the content creation device or is maintained remotely from the content creation device.

Example 38

This example includes any or all of the features of any one of examples 30 to 33, wherein the method further includes analyzing at least one of the depth data and color data to detect an object within the real world environment; and the three dimensional model includes a representation of a detected object within the real world environment.

Example 39

This example includes any or all of the features of example 38, wherein the method further includes obtaining the depth data in one or more first frames with a depth camera; and obtaining the color data with one or more second frames with a visual camera; wherein the analyzing at least one of the depth data and color data to detect an object includes executing image processing operations on at least one of the first or second frames.

Example 40

This example includes any or all of the features of example 39, wherein the method further includes identifying a detected object in the real world environment.

Example 41

This example includes any or all of the features of example 40, wherein: the image processing operations comprise performing object detection on at least one of the first or second frames; and the identifying a detected object includes at least in part by comparing an output of the image processing operations to a database of predefined objects.

Example 42

This example includes any or all of the features of example 40, wherein the method further includes: determining object parameters corresponding to an identified detected object; and correlating the object parameters with a representation of an identified detected object in the three dimensional model.

Example 43

This example includes any or all of the features of example 40, wherein the determining the object parameters is performed at least in part by comparing an identified object to a database correlating a plurality of predefined objects with corresponding object parameters.

Example 44

This example includes any or all of the features of example 40, wherein the method further includes: executing segmentation operations on the three dimensional model to segment a representation of the identified object in the three dimensional model from the remainder of the three dimensional model.

Example 45

This example includes any or all of the features of example 44, wherein the segmentation operations result in a void in the three dimensional model, and the CCM is further to perform model update operations to fill in the void.

Example 46

This example includes any or all of the features of any one of examples 30 to 33, wherein the method further includes, with the content creation device: combining a plurality of constituent three dimensional models to produce an aggregate model, the plurality of constituent three dimensional models including a first constituent model of a first real world location and a second constituent model of a second real world location, the first and second real world locations being arranged in a real world arrangement; wherein in the aggregate model, the first and second constituent models are arranged in substantially the same manner as the real world arrangement.

Example 47

This example includes any or all of the features of example 46, wherein: the first and second constituent models comprise first and second mesh models, respectively; and combining the plurality of constituent three dimensional models includes combining a mesh of the first mesh model with a mesh of the second mesh model.

Example 48

This example includes any or all of the features of example 46, wherein: the first constituent model is associated with first metadata identifying one or more first anchor points in the first constituent model, each first anchor point corresponding to an access point in the first real world location; the second constituent model is associated with second metadata identifying one or more second anchor points in the second constituent model, each second anchor point corresponding to an access point in the first real world location; and combining the plurality of constituent three dimensional models to produce the aggregate model includes joining the first and second constituent models such that in the aggregate model, a first anchor point of the first constituent model is substantially aligned with a second anchor point of the second constituent model.

Example 49

This example includes any or all of the features of example 48, wherein: the first constituent model includes a plurality of first anchor points; and in the aggregate model, a selected one of the plurality of first anchor points is substantially aligned with a second anchor point of the second constituent model.

Example 50

This example includes any or all of the features of example 49, wherein: each of the plurality of first anchor points of the first constituent model is associated with first contextual information; each second anchor point of the second constituent model is associated with second contextual information; and the method further includes identifying the selected one of the plurality of first anchor points based at least on a comparison of the first contextual information of each of the plurality of first anchor points with second contextual information associated with each second anchor point.

Example 51

This example includes any or all of the features of example 50, wherein the contextual information includes location information.

Example 52

This example includes any or all of the features of example 51, wherein the location information specifies a real world location of each of the first and second anchor points.

Example 53

This example includes any or all of the features of example 52, wherein identifying the selected one of the plurality of first anchor points includes determining whether a first anchor point is within a threshold distance of a second anchor point.

Example 54

This example includes any or all of the features of example 50, wherein the contextual information further includes orientation information, the orientation information specifying an orientation of a corresponding one of the first and second anchor points.

Example 55

This example includes any or all of the features of example 54, wherein identifying the selected one of the plurality of first anchor points includes determining whether a first anchor point is within a threshold distance of a second anchor point.

Example 56

This example includes any or all of the features of example 55, wherein the method further includes determining whether the orientation of the selected one of the plurality of first anchor points is the same as the second anchor point and, if not, reorienting at least one of the first constituent model and the second constitute model.

Example 57

This example includes any or all of the features of example 50, wherein identifying the selected one of the plurality of first anchor points is performed such that in the aggregate model, one or more of the plurality of constituent three dimensional models does not conflict with another of the plurality of constituent three dimensional models.

Example 58

This example includes any or all of the features of example 46, wherein: the aggregate model is a video game world; and the method further includes introducing video game characters into the video game world.

Example 59

According to this example there is provided at least one computer readable medium including instructions which when executed by a processor of a content creation device result in the performance of the following operations including: producing a three dimensional model of a real world environment based at least in part on depth data of the real world environment; analyzing at least one of the depth data and color data of the real world environment to detect one or more access points in the real world environment; and correlating a portion of the three dimensional model with a detected access point.

Example 60

This example includes any or all of the features of example 59, wherein the instructions when executed further result in the performance of the following operations including: correlating contextual information of at least one sensor with the portion of the three dimensional model corresponding to a detected access point.

Example 61

This example includes any or all of the features of example 60, wherein the contextual information includes at least one of orientation information, location information, or accelerometer information.

Example 62

This example includes any or all of the features of example, wherein the contextual information includes location information.

Example 63

This example includes any or all of the features of any one of examples 59 to 62, wherein the instructions when executed further result in the performance of the following operations including: obtaining the depth data in one or more first frames with a depth camera; and obtaining the color data with one or more second frames with a visual camera; wherein the analyzing at least one of the depth data and color data includes executing image processing operations on at least one of the first or second frames.

Example 64

This example includes any or all of the features of example 63, wherein the instructions when executed further result in the performance of the following operations including: identifying a type of the detected access point.

Example 65

This example includes any or all of the features of example 64, wherein: the image processing operations comprise performing object detection on at least one of the first or second frames, and the identifying is performed at least in part by comparing an output of the object detection operations to a database of predefined access points.

Example 66

This example includes any or all of the features of example 65, wherein the database of predefined access points is stored in a memory of the content creation device or is maintained remotely from the content creation device.

Example 67

This example includes any or all of the features of any one of examples 59 to 62, wherein the instructions when executed further result in the performance of the following operations including: analyzing at least one of the depth data and color data to detect an object within the real world environment; and the three dimensional model includes a representation of a detected object within the real world environment.

Example 68

This example includes any or all of the features of example 67, wherein the instructions when executed further result in the performance of the following operations including: obtaining the depth data in one or more first frames with a depth camera; and obtaining the color data with one or more second frames with a visual camera; wherein the analyzing at least one of the depth data and color data to detect an object includes executing image processing operations on at least one of the first or second frames.

Example 69

This example includes any or all of the features of example 68, wherein the instructions when executed further result in the performance of the following operations including: identifying a detected object in the real world environment.

Example 70

This example includes any or all of the features of example 69, wherein: the image processing operations comprise performing object detection on at least one of the first or second frames; and the identifying a detected object includes at least in part by comparing an output of the image processing operations to a database of predefined objects.

Example 71

This example includes any or all of the features of example 69, wherein the instructions when executed further result in the performance of the following operations including: determining object parameters corresponding to an identified detected object; and correlating the object parameters with a representation of an identified detected object in the three dimensional model.

Example 72

This example includes any or all of the features of example 69, wherein the determining the object parameters is performed at least in part by comparing an identified object to a database correlating a plurality of predefined objects with corresponding object parameters.

Example 73

This example includes any or all of the features of example 69, wherein the instructions when executed further result in the performance of the following operations including: executing segmentation operations on the three dimensional model to segment a representation of the identified object in the three dimensional model from the remainder of the three dimensional model.

Example 74

This example includes any or all of the features of example 73, wherein the segmentation operations result in a void in the three dimensional model, and the instructions when executed further result in the performance of the following operations including: performing model update operations to fill in the void.

Example 75

This example includes any or all of the features of any one of examples 59 to 62, wherein the instructions when executed further result in the performance of the following operations including: combining a plurality of constituent three dimensional models to produce an aggregate model, the plurality of constituent three dimensional models including a first constituent model of a first real world location and a second constituent model of a second real world location, the first and second real world locations being arranged in a real world arrangement; wherein in the aggregate model, the first and second constituent models are arranged in substantially the same manner as the real world arrangement.

Example 76

This example includes any or all of the features of example 75, wherein: the first and second constituent models comprise first and second mesh models, respectively; and combining the plurality of constituent three dimensional models includes combining a mesh of the first mesh model with a mesh of the second mesh model.

Example 77

This example includes any or all of the features of example 75, wherein: the first constituent model is associated with first metadata identifying one or more first anchor points in the first constituent model, each first anchor point corresponding to an access point in the first real world location; the second constituent model is associated with second metadata identifying one or more second anchor points in the second constituent model, each second anchor point corresponding to an access point in the first real world location; and combining the plurality of constituent three dimensional models to produce the aggregate model includes joining the first and second constituent models such that in the aggregate model, a first anchor point of the first constituent model is substantially aligned with a second anchor point of the second constituent model.

Example 78

This example includes any or all of the features of example 77, wherein: the first constituent model includes a plurality of first anchor points; and in the aggregate model, a selected one of the plurality of first anchor points is substantially aligned with a second anchor point of the second constituent model.

Example 79

This example includes any or all of the features of example 78, wherein: each of the plurality of first anchor points of the first constituent model is associated with first contextual information; each second anchor point of the second constituent model is associated with second contextual information; and the instructions when executed further result in the performance of the following operations including: identifying the selected one of the plurality of first anchor points based at least on a comparison of the first contextual information of each of the plurality of first anchor points with second contextual information associated with each second anchor point.

Example 80

This example includes any or all of the features of example 79, wherein the contextual information includes location information.

Example 81

This example includes any or all of the features of example 80, wherein the location information specifies a real world location of each of the first and second anchor points.

Example 82

This example includes any or all of the features of example 81, wherein identifying the selected one of the plurality of first anchor points includes determining whether a first anchor point is within a threshold distance of a second anchor point.

Example 83

This example includes any or all of the features of example 79, wherein the contextual information further includes orientation information, the orientation information specifying an orientation of a corresponding one of the first and second anchor points.

Example 84

This example includes any or all of the features of example 83, wherein identifying the selected one of the plurality of first anchor points includes determining whether a first anchor point is within a threshold distance of a second anchor point.

Example 85

This example includes any or all of the features of example 84, wherein the instructions when executed further result in the performance of the following operations including: determining whether the orientation of the selected one of the plurality of first anchor points is the same as the second anchor point and, if not, reorienting at least one of the first constituent model and the second constitute model.

Example 86

This example includes any or all of the features of example 80, wherein identifying the selected one of the plurality of first anchor points is performed such that in the aggregate model, one or more of the plurality of constituent three dimensional models does not conflict with another of the plurality of constituent three dimensional models.

Example 87

This example includes any or all of the features of example 75, wherein the aggregate model is a video game world, and the instructions when executed further result in the performance of the following operations including: introducing video game characters into the video game world.

Example 88

According to this example there is provided an apparatus including means to perform the method of any one of examples 30 to 58.

Example 89

According to this example there is provided a content creation device including: processing means; memory means; camera means; sensor means; and content creation means, wherein: the camera means is to obtain depth data of a real world environment and color data of the real world environment; and the content creation means is to: produce a three dimensional model of the real world environment based at least in part on the depth data; analyze at least one of the depth data and color data to detect one or more access points in the real world environment; and correlate a portion of the three dimensional model with a detected access point.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:
1. A content creation device comprising:
processor circuitry;
at least one memory;
a depth camera and a visual camera;
a sensor to obtain contextual information, the sensor including at least one of a gyroscope, a global positioning sensor, or an accelerometer; and
content creation (CCM) circuitry to:
obtain depth data and color data of a first real world environment;
produce a first three dimensional model for the first real world environment based at least in part on the depth data of the first real world environment;
analyze at least one of the depth data or the color data to detect a first access point in the first real world environment;
provide a first anchor point representative of the detected first access point of the first real world environment to correlate a portion of the first three dimensional model with the detected first access point, the detected first access point including a first doorway, a first hallway, a first archway, or a combination thereof; and
correlate first contextual information with the portion of the first three dimensional model corresponding to the first anchor point representative of the detected first access point;

obtain depth data and color data of a second real world environment;

produce a second three dimensional model for the second real world environment based at least in part on the depth data of the second real world environment;

analyze at least one of the depth data or the color data of the second real world environment to detect a second access point in the second real world environment;

provide a second anchor point representative of the detected second access point of the second real world environment to correlate a portion of the second three dimensional model with the detected second access point, the detected second access point including a second doorway, a second hallway, a second archway, or a combination thereof;

correlate second contextual information with the portion of the second three dimensional model corresponding to the second anchor point representative of the detected second access point;

compare the first contextual information and the second contextual information including location and orientation information associated with the respective ones of the first anchor point and the second anchor point; and combine the first and second three dimensional models to produce an aggregate model in response to determining that the first anchor point of the first three dimensional model is substantially aligned with the second anchor point of the second model based on at least the location and orientation information associated with the respective first and second anchor points.

2. The content creation device of claim 1, wherein:
the depth data is stored in one or more first frames in the at least one memory;
the color data is stored in one or more second frames in the at least one memory; and
the CCM circuitry is to detect the first access point at least in part by executing image processing operations on at least one of the first or second frames.

3. The content creation device of claim 2, wherein:
the CCM circuitry is to perform the image processing operations by performing object detection on at least one of the first or second frames;
the CCM circuitry is to identify a type of the detected first access point at least in part by comparing an output of the object detection operations to a database of access points.

4. The content creation device of claim 1, wherein:
the depth data is stored in one or more first frames in the at least one memory;
the color data is stored in one or more second frames in the at least one memory;
the CCM circuitry is to execute image processing operations on at least one of the first or second frames to detect one or more objects in the first real world environment; and
the first three dimensional model includes a representation of a detected object within the first real world environment.

5. The content creation device of claim 4, wherein:
the CCM circuitry is to perform the image processing operations to detect one or more objects by performing object detection on at least one of the first or second frames, and the CCM circuitry is to identify a type of detected object at least in part by comparing an output of the image processing operations to a database of objects; and the CCM circuitry is to:
determine object parameters corresponding to an identified detected object; and
correlate the object parameters with a representation of an identified detected object in the first three dimensional model.

6. The content creation device of claim 1, wherein
in the aggregate model, the first and second three dimensional models are arranged corresponding to a real world arrangement of the first and second real world environments.

7. The content creation device of claim 6, wherein:
the first three dimensional model is associated with first metadata identifying the first anchor point in the first three dimensional model; and
the second three dimensional model is associated with second metadata identifying the second anchor point in the second three dimensional model.

8. A method for producing a three dimensional model with a content creation device (CCM), the method comprising:

producing a first three dimensional model of a first real world environment based at least in part on depth data and color data of the first real world environment;

analyzing at least one of the depth data and color data of the first real world environment to detect a first access point in the first real world environment;

assigning a first anchor point to the first three dimensional model representative of the detected first access point of the first real world environment to correlate a portion of the first three dimensional model with the detected first access point, the detected first access point including a first doorway, a first hallway, a first archway, or a combination thereof; and correlating contextual information of a sensor with the portion of the first three dimensional model corresponding to the detected first access point, wherein the sensor includes at least one of a gyroscope, a global positioning sensor, or an accelerometer;

producing a second three dimensional model of a second real world environment based at least in part on depth data and color data of the second real world environment;

analyzing at least one of the depth data and color data of the second real world environment to detect a second access point in the second real world environment;

assigning a second anchor point to the second three dimensional model representative of the detected second access point of the second real world environment to correlate a portion of the second three dimensional model with the detected second access point, the detected second access point including a second doorway, a second hallway, a second archway, or a combination thereof;

correlating contextual information of the sensor with the portion of the second three dimensional model corresponding to the detected second access point;

comparing the first contextual information and the second contextual information including location and orientation information associated with the respective ones of the first anchor point and the second anchor point; and combining the first and second three dimensional models to produce an aggregate model in response to determining that the first anchor point of the first three dimensional model is substantially aligned with the second anchor point of the second three dimensional model based on at least the location and orientation information associated with the respective first and second anchor points.

9. The method of claim 8, further including:
obtaining the depth data in one or more first frames with a depth camera; and
obtaining the color data with one or more second frames with a visual camera; wherein:
the analyzing of at least one of the depth data and color data to detect the first access point includes executing image processing operations on at least one of the first or second frames; and
the first three dimensional model includes a representation of the first detected access point.

10. The method of claim 9, further including:
performing object detection operations on at least one of the first or second frames to detect objects in the first real world environment, and
identifying a type of detected object at least in part by comparing an output of the object detection operations to a database of access points.

11. The method of claim 9, further including:
analyzing at least one of the depth data and color data to detect an object within the first real world environment;
wherein the analyzing includes executing image processing operations on at least one of the first or second frames.

12. The method of claim 9, wherein:
the image processing operations include performing object detection on at least one of the first or second frames to detect one or more detected objects; and
the method further includes:
identifying a detected object at least in part by comparing an output of the image processing operations to a database of objects;
determining object parameters corresponding to an identified detected object; and
correlating the object parameters with a representation of an identified detected object in the first three dimensional model.

13. The method of claim 8, wherein in the aggregate model, the first and second three dimensional models are arranged corresponding to a real world arrangement of the first and second real world environments.

14. The method of claim 13, wherein:
the first three dimensional model is associated with first metadata identifying the first anchor point; and
the second three dimensional model is associated with second metadata identifying the second anchor point.

15. A non-transitory computer readable medium comprising instructions that, when executed, cause at least one processor to:
produce a first three dimensional model of a first real world environment based at least in part on depth data of the first real world environment;
analyze at least one of the depth data and color data of the first real world environment to detect a first access point in the first real world environment;
assigning a first anchor point to the first dimensional model representative of the detected first access point of the first real world environment to correlate a portion of the first three dimensional model with the detected first access point, the detected first access point including a first doorway, a first hallway, a first archway, or a combination thereof;
correlate contextual information of at least one sensor with the portion of the first three dimensional model corresponding to the first detected access point;
produce a second three dimensional model of a second real world environment based at least in part on depth data and color data of the second real world environment;
analyze at least one of the depth data and color data of the second real world environment to detect a second access point in the second real world environment;
assign a second anchor point to the second three dimensional model representative of the detected second access point of the second real world environment to correlate a portion of the second three dimensional model with the detected second access point, the detected second access point including a second doorway, a second hallway, a second archway, or a combination thereof;
correlate contextual information of the sensor with the portion of the second three dimensional model corresponding to the detected second access point;
compare the first contextual information and the second contextual information including location and orientation information associated with the respective ones of the first anchor point and the second anchor point; and
combining the first and second three dimensional models to produce an aggregate model in response to determining that the first anchor point of the first three dimensional model is substantially aligned with the second anchor point of the second three dimensional model based on at least the location and orientation information associated with the respective first and second anchor points.

16. The non-transitory computer readable medium of claim 15, wherein the instructions when executed cause the at least one processor to:
obtaining the depth data in one or more first frames with a depth camera; and
obtaining the color data with one or more second frames with a visual camera;
wherein:
to analyze at least one of the depth data and color data to detect the first access point, the instructions cause the at least one processor to execute image processing operations on at least one of the first or second frames to detect the first access point within the first real world environment; and
the three dimensional model includes a representation of the detected first access point.

17. The non-transitory computer readable medium of claim 16, wherein the instructions when executed cause the at least one processor to:
perform object detection operations on at least one of the first or second frames to detect objects in the first real world environment, and
identify a type of detected object at least in part by comparing an output of the object detection operations to a database of predefined access points.

18. The non-transitory computer readable medium of claim 17, wherein the instructions when executed cause the at least one processor to:
determine object parameters corresponding to an identified detected object; and
correlating the object parameters with a representation of an identified detected object in the first three dimensional model.

19. The non-transitory computer readable medium of claim 15, wherein the instructions when executed cause the at least one processor to:
- arrange the first and second three dimensional models corresponding to a real world arrangement of the respective first and second real world environments.

20. The non-transitory computer readable medium of claim 19, wherein:
- the first three dimensional model is associated with first metadata identifying the first anchor point; and
- the second three dimensional model is associated with second metadata identifying the second anchor point.

21. The non-transitory computer readable medium of claim 19, wherein the aggregate model is a video game world, and the instructions when executed cause the at least one processor to:
- introduce video game characters into the video game world.

\* \* \* \* \*